United States Patent [19]
Naylor, Jr.

[11] Patent Number: 5,706,105
[45] Date of Patent: Jan. 6, 1998

[54] DITHER METHOD AND APPARATUS

[75] Inventor: William Clark Naylor, Jr., Santa Clara, Calif.

[73] Assignee: Canon Kabushiki Kaisha, Tokyo, Japan

[21] Appl. No.: 509,820

[22] Filed: Aug. 1, 1995

[30] Foreign Application Priority Data

Aug. 1, 1994 [AU] Australia .............................. PM 7194

[51] Int. Cl.$^6$ .................................................. H04N 1/40
[52] U.S. Cl. ............................ 358/457; 382/274; 382/285
[58] Field of Search ...................................... 395/108, 118, 395/119, 120, 124, 125, 127; 358/429, 455, 456, 457, 459, 465; 382/169, 237–239, 270, 274, 285

[56] References Cited

U.S. PATENT DOCUMENTS

| | | | |
|---|---|---|---|
| 4,985,856 | 1/1991 | Kaufman et al. | 364/522 |
| 5,038,302 | 8/1991 | Kaufman | 364/522 |
| 5,101,475 | 3/1992 | Kaufman et al. | 395/124 |
| 5,243,441 | 9/1993 | Kawata | 358/451 |
| 5,444,551 | 8/1995 | Miller et al. | 358/456 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

A method of creating a three dimensional halftone dither matrix, in which the matrix is divided into a predetermined number of levels with each level comprising a two dimensional matrix of activation indicators having positional values including x and y positional components. The method includes the steps of firstly creating a series of three dimensional curves, from a two dimensional array of dither values, the two dimensional array being of the same dimensions as the two dimensional matrix and including level value entries, each of the level value entries having a corresponding three dimensional curve, the three dimensional curve starting at a starting level corresponding to the dither matrix value and at a position corresponding to the x and y positional components of the level value entry, the three dimensional curve terminating at the highest level of the three dimensional halftone dither matrix and taking one x and y positional value on each level between the starting level and the highest level. Secondly, the method forms an objective function having at least two components, a first component being a measure of the evenness of the distribution of the positional values of the curves for a particular level, and the second component being a measure of the deviation of the curve from a straight vertical line. Thirdly, the method optimizes the objective function so that the positional values at any of the levels of the series of curves have a high degree of evenness of distribution and the curves have a low degree of deviation from a straight vertical line. Lastly, the method forms the three dimensional halftone dither matrix wherein the activation indicators are active in positions corresponding to the paths of each of the curves.

11 Claims, 6 Drawing Sheets

DITHER METHOD AND APPARATUS

FIELD OF THE INVENTION

The present invention relates to reproduction of images through the use of halftoning and, more particularly, relates to a process of dithering utilised in the reproduction of images.

BACKGROUND ART

Halftoning techniques, such as dithering, are utilised when an output device is unable to display continuous tone values, and on it being to display a limited number of discrete levels for each pixel. The dithering process is intended to produce, on a desired output device having, for example, only a restricted grey scale capability, an image approximating, as close as possible, the original image. Although dithering has been shown to easily extend to multi-level output devices, in addition to colour printing devices, for the sake of clarity, it can be assumed that the output device is of the form of a bi-level black and white printing device.

The process of dithering traditionally involves the creation of a "dither matrix". Image pixel values are then normally compared with a corresponding value in the dither matrix. If the dither matrix value is less than the input pixel value, a marking device, such as a printer or display tube, produces a "on" pixel indication at that particular point.

The number of entries in the dither matrix is normally substantially smaller than the number of entries in the input pixel image. Therefore, the most common technique utilised in the art for addressing a dither matrix is one that utilises modulo arithmetic. This corresponds to repeating or "tiling" the dither matrix over the input image.

The formation of a dither matrix is the most significant portion of the dithering process and the dither matrix should have a number of desirable attributes. These include:

1. The dither matrix should be as large as possible so as to avoid the occurrence of repeated patterns in the output image produced by the repetitive or tiling nature of the dither matrix.
2. The dither matrix should have as fine a "granularity" as possible, the granularity preferably not exceeding the granularity of the input image. Hence, the number of levels that each value within the dither matrix can take should, preferably, be equal to the number of levels that the input pixels may take. This avoids the unnecessary loss of detail in the output image through over quantisation of the input image.
3. With larger dither matrix sizes, it is desirable that the values within the dither matrix be evenly distributed across all possible values of input pixels. This can effectively be achieved by repeating each level, in the dither matrix, the same number of times.
4. The distribution of the dither matrix values should be chosen so as to avoid unwanted artifacts in any output image. Unwanted artifacts can occur in areas of an image that are of the same intensity or slightly varying intensities due to regularities occurring in the dither matrix.
5. At each intensity level, it is desirable that the relevant output marking device creates a half tone image that is as evenly distributed as possible. This requirement can be met by "spreading out" those pixels which will be illuminated at each possible level.

The need to provide a dithering technique that "spreads out" the marked output points at each level is particularly important, as is the need to ensure areas with slightly varying levels of intensity also produce a dithered output where the output pixels are as evenly distributed, or are spread, out as far as possible.

SUMMARY OF THE INVENTION

It is an object of the present invention to provide an alternative form of dithering which leads to improved output images for at least some class of images.

In accordance with a first aspect of the present invention there is provided a method of creating a three dimensional halftone dither matrix, the matrix being divided into a predetermined number of levels with each level comprising a two dimensional matrix of activation indicators having positional values including x and y positional components, the method being performed using a computer and including the steps of:

(a) creating a series of three dimensional curves, from a two dimensional array of dither values, the two dimensional array being of the same dimensions as the two dimensional matrix and comprising level value entries, each of the level value entries having a corresponding three dimensional curve, the three dimensional curve starting at a starting level corresponding to the dither matrix value and at a position corresponding to the x and y positional components of the level value entry, said three dimensional curve terminating on the highest level of the three dimensional halftone dither matrix and taking one x and y positional value on each level between the starting level and said highest level, b) forming an objective function having at least two components, a first component being a measure of the evenness of the distribution of the positional values of the curves for a particular level, and the second component being a measure of the deviation of the curve from a straight vertical line, (c) optimising the objective function so that the positional values at any of the levels of the series of curves have a high degree of evenness of distribution and the curves have a low degree of deviation from a straight vertical line, and (d) forming the three dimensional halftone dither matrix wherein said activation indicators are active in positions corresponding to the paths of each of the curves.

In accordance with a second aspect of the present invention there is provided an apparatus for halftoning an input image including:

an inputting device of inputting pixel data values including intensity level and address data, a table look up device, connected to the inputting device, and containing a series of two dimensional arrays constructed in accordance with the preceding paragraph, the intensity level data being used to select one of the series of two dimensional arrays and address data being used to address a data value within the selected two dimensional array, and a marking device, connected to the lookup device, for making an output image when the data value exceeds a predetermined threshold.

BRIEF DESCRIPTION OF THE DRAWINGS

The preferred embodiment of the present invention are described with reference to accompanying drawings in which.

Appendix 1 is a computer program listing for the creation of a 3-dimensional matrix in accordance with the preferred embodiment;

Appendix 2 is a listing of the simulated annealing library routines; and

Appendix 3 is a listing of the simulated annealing codes.

DETAILED DESCRIPTION

Figure 1:
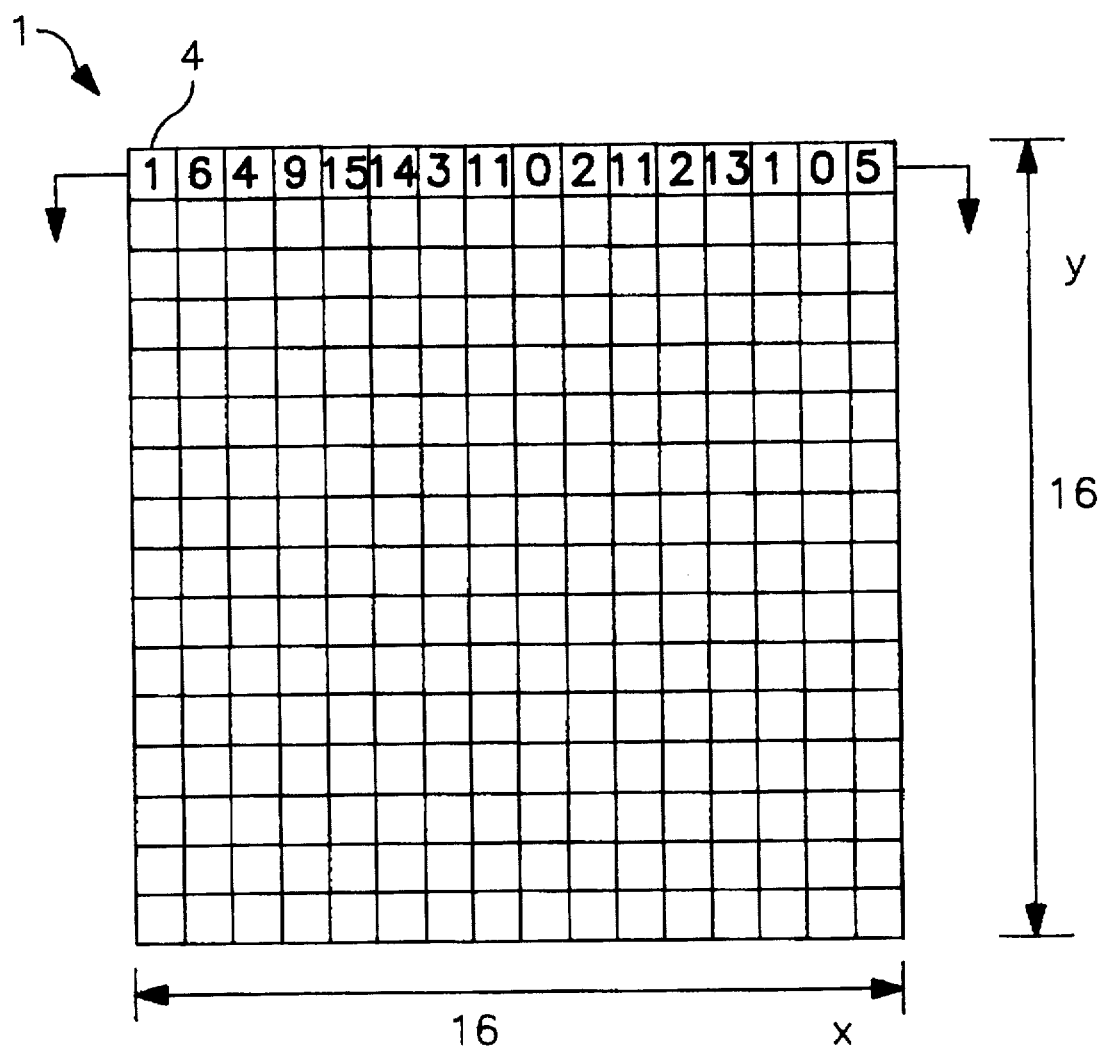
FIG. 1 illustrates the process of formation of dither matrices.

Referring now to FIG. 1, there is shown an example of a 16×16 dither matrix 1. The dither matrix 1 comprises a large number of entries 2, the values of which are initially assigned in accordance with any of the standard techniques, for example the Bayer technique as outlined in standard text books such as "Computer Graphics—Principles and Practice", Foley et al., second edition 1990, Addison-Wesley Publishing Company, Inc. Reading, Mass. at pages 568–573.

However, the preferable method of assignment is as set out in detail hereinafter under the sub-heading "Initial Assignment of Dither Matrix Values". If the entries 2 have been assigned in accordance with the preferred method, the resultant values will produce, at each possible output level, a substantially evenly distributed output. The dither matrix formation process mentioned under the heading entitled "Initial Assignment of Dither Matrix Values" tends to produce a matrix with values distributed in a slightly random pattern due to the nature of the simulated annealing process which is also described hereinafter in greater detail. The first row of dither matrix 1 is shown in FIG. 1 containing a set of sample values which are assumed to form part of the resulting dither matrix after the completion of the assignment process.

Figure 2:
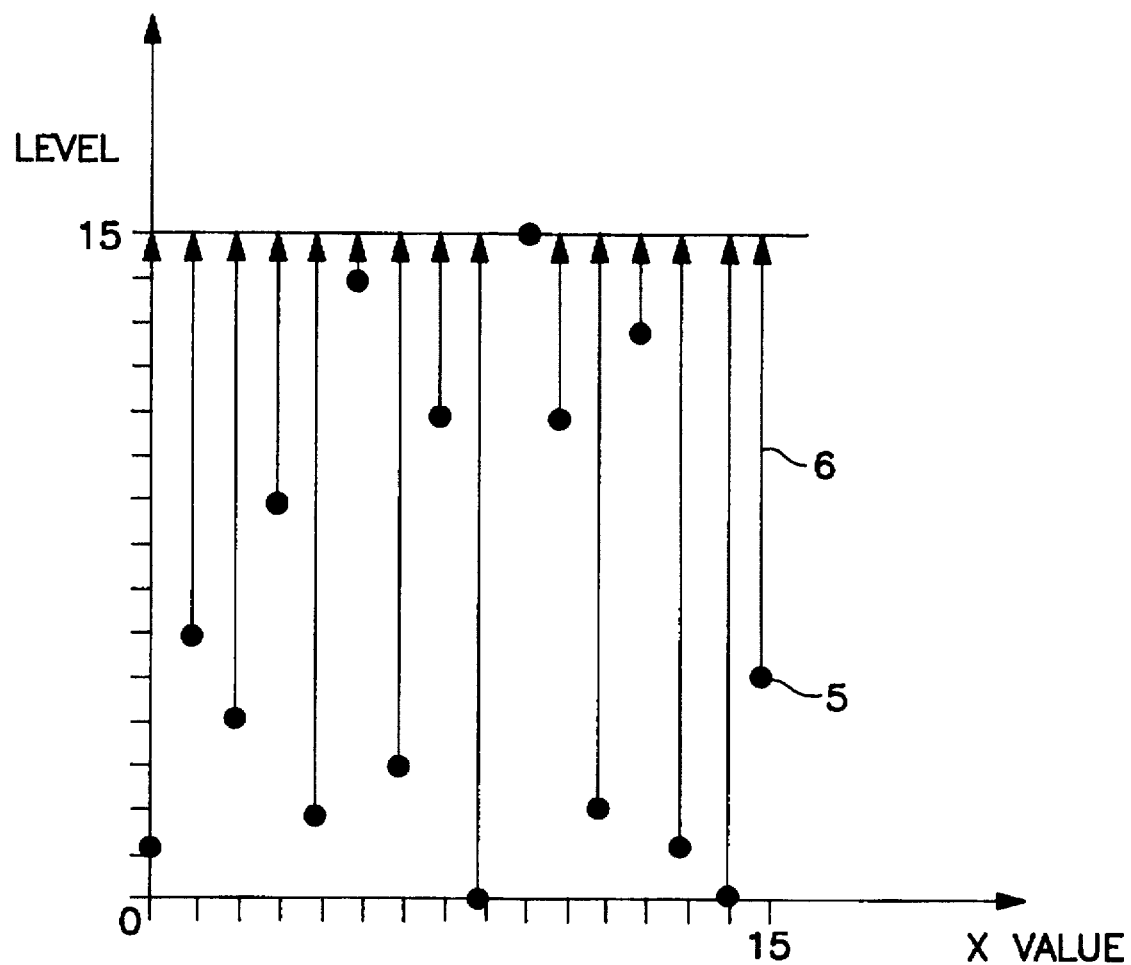
FIG. 2 is a graph illustrating the illumination of output pixels when dithered with the first row of the dither matrix of FIG. 1.

Referring now to FIG. 2, there is shown a graph having a first axis (X value) having 16 graduations (0–15) corresponding to the 16 possible column positions of the first row of the dither matrix 1 of FIG. 1, The Y axis is represented by a level scale having graduations from 0–15. If it is assumed that input pixels take on one of 16 separate values (0–15), markers 5, illustrate the level value at which pixels which map to the corresponding X value are turned on. A line 6 illustrates those pixel level values greater than the corresponding marker value 5, which produce a corresponding "turning on" of the output pixel. Hence, if the dither matrix value in column 15 of the first row is 5, all corresponding input pixel level values in the range 5 to 15 cause the output value at this location to be turned on.

The method described hereinafter under the sub-heading "Initial Assignment of Dither Matrix Values" is directed to evenly spreading out those pixels which are currently turned "on" at each level. Of course, FIG. 2 represents only one row of the dither matrix and, as the method is applied in both the X and Y axis of the dither matrix, a three dimensional form of FIG. 2 is created, with FIG. 2 showing a slice through the Y axis at the first row of Y.

Unfortunately, when utilising a dither matrix assignment technique such as the one outlined below, once a dither matrix value 5 has been assigned a position in the array, the corresponding line 6 is fixed for all higher levels. Therefore, even though certain levels, (eg. level 1) may be in some form of equilibrium, the need to turn on more and more pixels within the dither matrix at higher levels disturbs this equilibrium and enforces higher levels to not be in the best possible equilibrium or "spread out" state.

One method which is utilised to overcome this problem is to store a separate bit map for each level indicating whether a pixel is on or off at that level. These bit maps are then separately optimised, for example using simulated annealing, to produce patterns which are of a spread out nature at each level. One such method for optimising separate bit maps for each level of output is disclosed in U.S. Pat. No. 4,920,501 entitled "Digital Halftoning with Minimum Visual Modulation Patterns" by Sullivan et al. However, that method is unsuitable as the separate optimisation of each bit map level has been found in practice not to produce optimal results for most images. Most images often comprise large regions of slowly varying pixel intensity levels. Therefore, in such slow varying areas, only a few contiguous levels are involved. In such areas, it has been found that the independent minimisation of the levels of the dither matrix result in interference effects occurring between levels such as to produce a sub-optimal result, with noticeable clumping of pixels a result of this interference.

In the preferred embodiment of the present invention, the line 6 of FIG. 2 is made to alter its path at higher levels if this results in a more evenly distributed or spaced out pattern, with a penalty being paid for the alteration.

Figure 3:
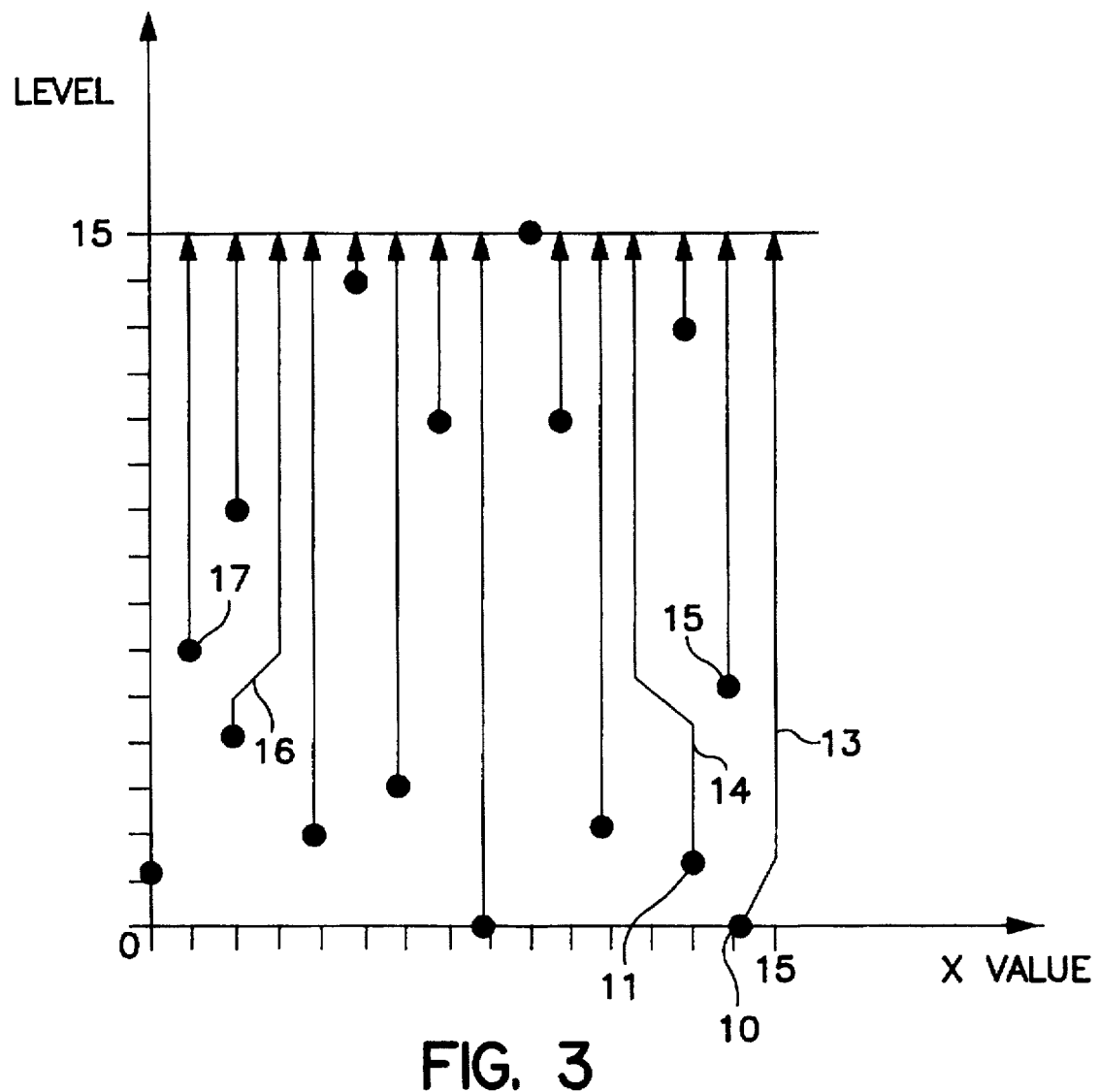
FIG. 3 illustrates the illumination of pixels when dithered with the matrices created in accordance with the preferred embodiment.

Referring now to FIG. 3, there is shown an example of this process. In this example, a dither matrix value 10 is initially turned "on" in column 14 (X value) at level zero. Subsequently, a determination is made to turn on to the matrix value 11 at level 1. This causes the corresponding path or curve 13 to be altered in the vicinity of a matrix point 11 so as to produce a more spread out distribution at each level. Similarly, path 14 is altered in the vicinity of point 15, and the path 16 is also altered in the vicinity of the point 17. Although movement of the curve 13 from one layer to the next can produce unwanted interference effects, the resultant more even distribution of pixels illuminated at each level also produces an improved output image.

Unfortunately, the number of different combinations possible in optimising the process of the preferred embodiment is excessive. FIG. 3 shows only the X axis of one column. Inclusion of the Y axis adds an additional dimension to the problem. The finding of an exact combination or combinatorial solution of how best to assign values as is practically beyond current day computers for large size dither matrix system.

It should be noted that the preferred embodiment is not a traditional dither matrix system, as a bit map is required to be storm for each level indicating those tither matrix positions that are "turned on" at a particular level.

Additionally allowing the paths eg. 13, 14, 16 to change from the strictly vertical can, in some instances, produces unwanted interference effects between differing levels in slowly varying images.

The Simulated Annealing Process

The extreme complexity of the solution of the bit map production process suggests it is most likely of an NP-complete nature, and hence its attempted optimisation utilising a process such as "simulated annealing" would be beneficial. Simulated annealing is an efficient method for finding an approximation to a minimum value of a function of many independent variables. The function, usually called a "cost function" or "objective function" represents a quantitative measure of the "goodness" of some complex system.

The first step in the simulated annealing method is to generate an objective which has a value dependent upon a set of variables x1 to xm. The values of the variables x1 to xm are given a small random change and the objective is re-evaluated and compared to the old value of the objective. The change in the objective is referred to as $\Delta obj$.

If the change in the variables results in a lower objective value, then the new set of variables is always accepted. If the change in the variables results in a higher value for the objective, then the new set of variables may or may not be accepted. The decision to accept the new set of variables is determined with a given probability, the preferred probability of acceptance is:

$$Prob(\Delta obj) = e^{\left(\frac{-\Delta obj}{T}\right)} \quad \text{(EQ 1)}$$

where T is the simulated "temperature" of the system.

Hence for a given ($\Delta obj$), a high temperature T results in a high probability of acceptance of the change in the values of x1 to xm, where as at a low temperature T, there only is a small probability of acceptance. The temperature T is initially set to be quite high and is reduced slightly in each iteration of the annealing loop. The overall structure of a computer program, written in pseudo code, implementing the simulating annealing process is as follows:

```
T = start_temperature;
variable = start_variables
loop_until (convergence or temperature_too_cold)
{
    /* generate random change of variables*/
    new_variables = random_small_change(variables);
    /*evaluate random change*/
    (Δobj) = objective_function(new_variables) -
             objective_function(variables);
    if(Δobj<=0)
    { /*always accept improvements*/
        variables = new_variables;
    }
    else if (random_float_between_0_and_1( )<exp(-Δobj/T))
    {
        /*sometimes accept degradation*/
        variables = new_variables;
    }
    else
    {
        /*reject new_variables*/
    }
    decrease T slightly, according to annealing schedule;
}
```

Figure 4:
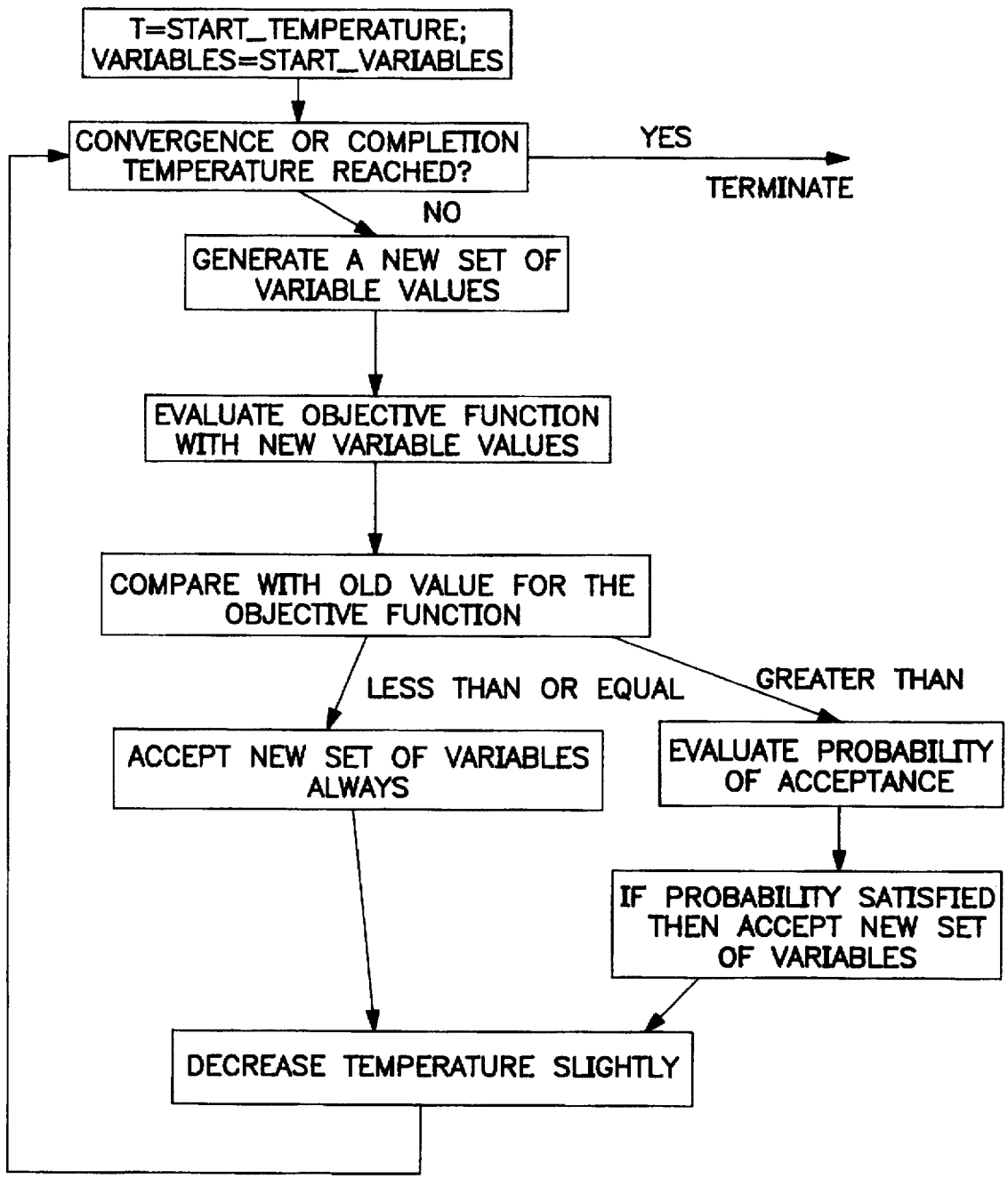
FIG. 4 is a flow chart of the simulated annealing process utilised in the preferred embodiment.

A flow chart for use in implementing the above is shown in FIG. 4. From the flow chart and the foregoing description, it is apparent that the procedure is not unlike the cooling of heated atoms to form a crystal. Hence the procedure is commonly known as "simulated annealing".

Initial Assignment of Dither Matrix Values

The preferred embodiment uses an initial assignment of dither matrix values that are determined by a simulated annealing process and which measure the "bunching" or "grouping" together of pixels of the same colour in the dithered image. By the same colour, it is meant that, for a particular intensity level, two separate dither cell values result in their respective pixels both being on, or both being off. It is likely that nearby pixels of the original image have the same or similar intensities; Therefore it is assumed that the original image has exactly the same intensity everywhere. For a given intensity in the original image, minimising a function of the form as shown in Equation 2 leads to a smoothly dithered pattern for that intensity.

$$obj = \sum_{\left[\begin{array}{c}\text{all possible pairs of points } (p1,p2) \\ \text{with the same colour at a given intensity} \\ p1 \text{ not equal to } p2\end{array}\right]} f(dist(p1,p2))$$

The function f is preferably one which decreases monotonically with distance, and dist( ) is a measure of the distance between points p1 and p2.

The preferred measure of distance dist( ) is the Euclidean distance between the points, but, because the dither matrix is generally repeated in the vertical and horizontal directions, dist( ) is measured modulo the size of the dither matrix.

If p1=(x1,y1)

p2=(x2,y2)

are two arbitrary cells in the dither matrix at positions (x1,y1) and (x2,y2), then, for an (n×m) dither matrix, the preferred distance measure is:

$$dist(p1,p2) = \sqrt{[(x1 - x2) \bmod n]^2 + [(y1 - y2) \bmod m]^2} \quad \text{(EQ 3)}$$

where the mod function extends to negative numbers in accordance with the following relation, which holds for all x:

$$x \bmod m = (x-m) \bmod m \quad \text{(EQ 4)}$$

For example, −3 mod 5=2 mod 5=2

The function f( ) is preferably chosen such that:

$$f(dist) = \frac{1}{dist^\gamma} \quad \text{(EQ 5)}$$

where $\gamma$ is a dispersion strength factor which is preferably equal to 1 although other positive values can be used.

Equation 2 gives the objective function for a single original image intensity level. To obtain an objective function which properly takes into account all possible image intensity levels, an objective function must be created which sums the quantity shown in Equation 2 for all possible intensities, as shown in Equation 6:

$$obj = \sum_{\left(\begin{array}{c}\text{all possible} \\ \text{intensities}\end{array}\right)} w(\text{intensity}) \times \quad \text{(EQ 6)}$$

$$\sum_{\left[\begin{array}{c}\text{all possible pairs of points } (p1,p2) \\ \text{with the same colour at a given intensity} \\ p1 \text{ not equal to } p2\end{array}\right]} f(dist(p1,p2))$$

where w(intensity) is a weighting factor which assigns a relative importance to image quality at each intensity level. It will be assumed for the purposes of explanation of the preferred embodiment that each intensity level is treated equally and hence all the w(intensity) values are equal to 1.

Alternatively, if the intensity range is scaled to be in the range from 0 to 1, $W_I$ (intensity) can be of the following form:

$$W_I(\text{intensity}) = \begin{cases} I \leq 0.5 \; W_I = \dfrac{1}{\sqrt{\text{Intensity}}} \\ I \geq 0.5 \; W = \dfrac{1}{\sqrt{I - \text{Intensity}}} \end{cases} \quad \text{(EQ 7)}$$

The preferred form of assignment leads to the final preferred objective function which is:

$$obj = \sum_{\left(\substack{\text{all possible} \\ \text{intensities}}\right)} \sum_{\left[\substack{\text{all possible pairs of points } (p1,p2) \\ \text{with the same colour at a given intensity} \\ p1 \text{ not equal to } p2}\right]} \left(\dfrac{1}{dist(p1,p2)}\right) \quad \text{(EQ 8)}$$

To use simulated annealing to optimise a dither matrix, a method of specifying how to apply a random change (mutation) to a given dither matrix is required. The preferred random mutation method is to choose two (x,y) coordinates of the dither matrix using an unbiased random number generator. The entries of the dither matrix at these two places are then swapped. Whether this swap is accepted as the new solution, or rejected and therefore undone, is determined by the simulated annealing criteria previously discussed.

Theoretical considerations indicate that the anneal should begin at a temperature of infinity. In the preferred embodiment, this is achieved by randomly scrambling the dither matrix values by performing the above mentioned random swap process on a very large number of dither cells and accepting all swaps without evaluating the objective function.

Efficiency Methods in the Computation of the Initial Dither Matrix

Unfortunately, the time to compute the required medium or large sized initial dither matrix using the method of the preferred embodiment, in its present form, is excessive. Several methods can be adopted to reduce this time and will now be described.

For an (n×m) dither matrix, the number of entries in the dither matrix is:

$$\text{\#entries} = n \times m \quad \text{(EQ 9)}$$

Equation 6 requires that each evaluation of the objective function has the following time order:

$$\text{Time Per Evaluation} = O(\text{\#entries}^2 \times \text{\#intensities}) \quad \text{(EQ 10)}$$
$$= O(n^2 \times m^2 \times \text{\#intensities})$$

For simulated annealing to work, every dither matrix entry must be swapped many times. If an 'epoch' is defined to be approximately equal to a number of swaps corresponding to the number of cells in the array (ie. an epoch is approximately equal to n×m), then the simulated annealing process may typically take several hundred epochs. Therefore the time for completion is approximately as follows:

$$\begin{aligned} \text{Time for Completion} &= \text{\#epochs} \times \quad \text{(EQ 11)} \\ &\quad \text{\#evaluations per epoch} \times \\ &\quad \text{\#time per evaluation} \\ &= O(\text{\#epochs} \times n^3 \times \\ &\quad m^3 \times \text{\#intensities}) \end{aligned}$$

For a 60×60 matrix for a 256 intensity level input image, annealed for 500 epochs, the number of iterations of the inner loop will be:

$$\text{Time for Completion} = 500 \times 60^3 \times 60^3 \times 256 \text{ iterations} \quad \text{(EQ 12)}$$
$$= 6.0 \times 10^{15} \text{ iterations}$$

Typical workstation computers can presently perform about 10⁹ iterations per hour, so such a computer would take centuries to complete the above task for the defined array size.

Now, given that D(p) is the dither matrix value at point p, then the number of intensity levels for which two dither matrix locations p1 and p2 will have the same colour (as previously defined) is:

$$\begin{aligned} &\text{\#intensifies } p1, p2 \text{ have same} \\ &\text{colour} = (\text{\#intensities} - |D(p1) - D(p2)|) \end{aligned} \quad \text{(EQ 13)}$$

Therefore Equation 8 is rearranged as follows:

$$obj = \sum_{\left[\substack{\text{all possible pairs of} \\ \text{points } (p1,p2) \text{ with} \\ p1 \text{ not equal to } p2}\right]} \dfrac{1}{dist(p1,p2)} \cdot \quad \text{(EQ 14)}$$
$$(\text{\#intensities} - |D(p1) - D(p2)|)$$

This removes the summation over all intensities of Equation 6 resulting in a substantial overall speedup.

The number of intensities (#intensities) is a constant and adding a constant to the objective function does not change the solution resulting from the optimisation. Therefore, this term can be removed from the objective function yielding:

$$obj = - \sum_{\left[\substack{\text{all possible pairs of} \\ \text{points } (p1,p2) \\ p1 \text{ not equal to } p2}\right]} \dfrac{|D(p1) - D(p2)|}{dist(p1,p2)} \quad \text{(EQ 15)}$$

Further speedups are obtained by noting that the simulated annealing process only requires the computation of the change in the objective function due to the swapping of two dither matrix entries and computation of the objective is not actually required. Most of the points in Equation 15 are unaltered when two dither matrix entries are swapped and only pairs involving one of the two chosen points involved in the swap change their values. The contribution to Equation 15 of a dither matrix entry Dc being located at point pc (ob_dp) is given by:

$$ob\_dp(Dc,pc) = - \sum_{\text{all points } p, \, p \text{ not equal to } pc} \dfrac{|Dc - Dp|}{dist(pc,p)} \quad \text{(EQ 16)}$$

Therefore, the change in the objective function given in Equation 15 due to swapping the dither matrix values located at the points p1 and p2 is given by:

$$\Delta \text{objective} = ob\_dp(D2,p1) + ob\_dp(D1, p2) - ob\_dp(D1,p1) - ob\_dp(D2,p2) \quad \text{(EQ 17)}$$

where dither matrix value D1 starts at point p1 and moves to point p2, and dither matrix value D2 starts at point p2 and moves to point p1.

The evaluation of Equation 17 requires the examination of every point of the dither matrix four times, rather than examination of every pair of points of the dither matrix as required by Equation 15. This again results in a substantial speedup and Equation 16 and Equation 17 are preferably used in the creation of small and medium sized dither matrices. The analysis leading to Equation 16 and Equation 17 can also be applied to the more general Equation 6, leading to the more general formulation for Equation 16 given by:

$$ob\_dp(Dc,pc) = - \sum_{\text{all points } p,\ p \text{ not equal to } pc} |Dc - Dp| \cdot f(dist(pc,p)) \quad (EQ\ 18)$$

The time taken to create a dither matrix using Equation 18 is:

Time for Completion=#epochs×#evaluations per epoch×#time per evaluation $=O(\text{\#epochs} \times n^2 \times m^2)$ (EQ 19)

This compares favourably with Equation 11 and is practical for small to medium sized dither matrices (less than say 5,000 entries).

For large dither matrixes, further speedup is required to make the annealing practical. This is achieved by using simple approximations.

The computation involved in Equation 16 involves an inverse distance relationship. This involves a large number of points that contribute very little to the final result because they are a large distance away from pc which is the point of interest. The approximation involves neglecting the contribution of these points, and only using points which are within a small distance of pc. This imposes a circular window about pc with a radius designated to be "window__radius", Spread out factor = $\sum\limits_{\begin{pmatrix}\text{all possible}\\\text{intensities}\end{pmatrix}} W_I(\text{intensity})$ Equation 16 can thus be approximated as follows:

$$ob\_dp(Dc,pc) = - \sum_{\begin{bmatrix}\text{all points } p,\ p \text{ not equal to } pc\\ \text{and } dist(p,pc) \leq \text{window\_radius}\end{bmatrix}} \frac{|Dc - Dp|}{dist(pc,p)}$$

Use of Equation 20 is found, in practice, to provide inferior resulting dither matrices because of the discontinuity introduced when the dist( ) equals window__radius. This discontinuity is remedied by using instead the following formula:

$$ob\_dp(Dc,pc) = \quad (EQ\ 21)$$

$$- \sum_{\begin{bmatrix}\text{all points } p,\ p \text{ not equal to } pc\\ \text{and } dist(p,pc) \leq \text{window\_radius}\end{bmatrix}} |Dc - Dp| \cdot \left( \frac{1}{dist(pc,p)} - \frac{1}{\text{window\_radius}} \right)$$

which removes this discontinuity and is used in the preferred embodiment when a larger dither matrix is required:

The function ob__dp used in Equation 16 is defined for Equation 18 to be:

$$ob\_dp(Dc,pc) = \quad (EQ\ 22)$$

$$- \sum_{\begin{bmatrix}\text{all points } p,\ p \text{ not equal to } pc\\ \text{and } dist(p,pc) \leq \text{window\_radius}\end{bmatrix}} |Dc - Dp| \cdot$$

$$(f(dist(pc,p)) - f(\text{window\_radius}))$$

The time to compute initial dither matrixes using Equation 21 or Equation 22 is then of the following order:

Time for Completion=$O(\text{\#epochs} \times n \times m \times \text{window\_radius}^2)$ (EQ 23)

This is found to be practical even for the creation of very large dither matrices. Reasonable values for window__radius are found to be between 7 and 12.

In the present embodiment, Equation 21 is used to obtain an initial dither matrix of size 16×16 with each element taking one of 64 possible levels.

Formation of Preferred Embodiment

The formation of the preferred embodiment relies heavily upon the use of simulated annealing. As noted previously, in order to utilise the process of simulated annealing it is necessary to form an objective function. The objective function utilised in the preferred embodiment has two components. The first is a measure of the degree with which the pixel patterns on each level are spread out or distributed. The second factor is a penalising factor which penalises the alteration of the trajectory of paths eg. 13, 14, 16 of FIG. 3. Hence, the objective function involves these two competing factors and is represented as follows:

Objective=Spread out factor+Path alteration factor (EQ 24)

The spread out factor is similar to that disclosed above in relation to the formulation of the initial dither matrix and has the form:

$$\sum_{\begin{bmatrix}\text{all possible pairs of points } (p1,p2)\\ \text{with the same colour at a given intensity}\\ p1 \text{ not equal to } p2\end{bmatrix}} \left( \frac{1}{dist(p1,p2)} \right) \quad (EQ\ 25)$$

where $W_I$ (intensity) is a weighting function which is a function having a relationship to the perceived magnitude by the human observer of each intensity level, with the preferable form being as set out in Equation 7.

Further, the function dist(p1,p2) is a distance measure between the points p1, p2 measured in a modulo sense with respect to the size of the dither matrix.

The path alteration factor is a measure of the amounts that a particular path deviates from a straight line. One such equation is as follows:

Path alteration factor = (EQ 26)

$$\sum_{\begin{bmatrix}\text{all possible pairs of points}\\ (p_1,p_2) \text{ on the path}\\ \& \ p_1 \neq p_2\end{bmatrix}} w_p(l_1 - l_2)[(x_1 - x_2)^2 (y_1 - y_2)^2]$$

Figure 5:
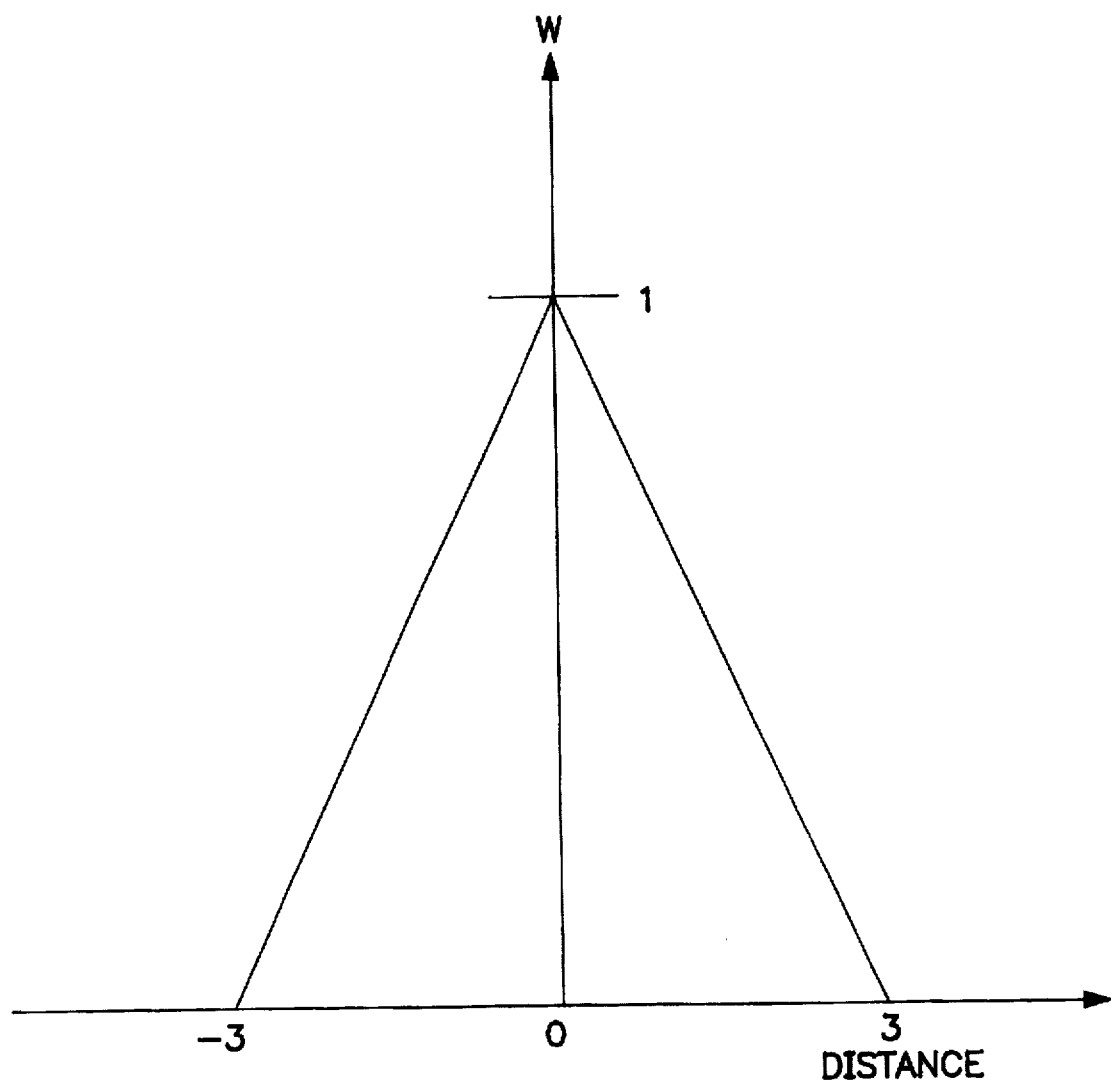
FIG. 5 illustrates the weighting function utilised in the simulated annealing process of the preferred embodiment.

In Equation 26, each point P of a path is represented by a three-tuple, having a x value, a y value, and a level value (l). The second weighting function $w_p(l_1-l_2)$ represents a weight applied which is a function of the distance between the two levels $l_1$ and $l_2$. Many different weighting functions can be used, however, FIG. 5 shows the weighting function used with the preferred embodiment which restricts the summation to points which are spaced less than six intensity levels apart. This has the effect of substantially reducing the computational requirements necessary to calculate the Path alteration factor of Equation 26.

The use of the present form of the equation for the Spread out factor (EQ 25), results in an excessive time for evaluation. A number of substantial optimisations can be made to this equation, in addition to the application of a "window of influence" which further substantially reduces the computation time for the evaluation of the spread out factor. These optimisations are as previously set out in relation to the formulation of the initial dither matrix and should be utilised for anything but small matrix sizes. In a preferred embodiment, the equation utilised for the spreading out factor is as follows:

$$\text{Spread out factor} = \sum_{\substack{\text{all possible} \\ \text{intensities}}} W_I(\text{intensity}) \sum_{\substack{\text{all possible pairs of} \\ \text{points } (p1,p2), \text{ with the} \\ \text{same colour at a given} \\ \text{intensity}, p1 \text{ not equal} \\ \text{to } p2, \text{ dist}(p1,p2) < \\ \text{window\_radius}}} \left( \frac{1}{\text{dist}(p1,p2)} - \frac{1}{\text{window\_radius}} \right) \quad \text{(EQ 27)}$$

where window_radius constitutes the window of influence and is preferably set to be seven pixels wide.

A three dimensional form of the initial dither matrix comprising a 16×16 array of X and Y values each having 64 possible levels was subjected to simulated annealing of a corresponding objective function of Equation 24 using the enclosed code on a Sun Microsystems Sparc 2 work station.

Although the present invention could start with any initial form of dither matrix, preferably, the initial dither matrix has some of the qualities 1 to 5 mentioned previously. Therefore, the initial matrix utilised is one constructed in accordance with the principles as outlined previously. The annealing process utilising the two competing objectives of Equation 24 was allowed to run for approximately four hours. Of course, larger dither matrix sizes and longer runs are more desirable, however, the time taken for completion of larger dither matrices will also increase substantially.

When the final series of bitmaps was used to dither a series of test images, it was found to produce superior results to other forms of dithering.

Figure 6:
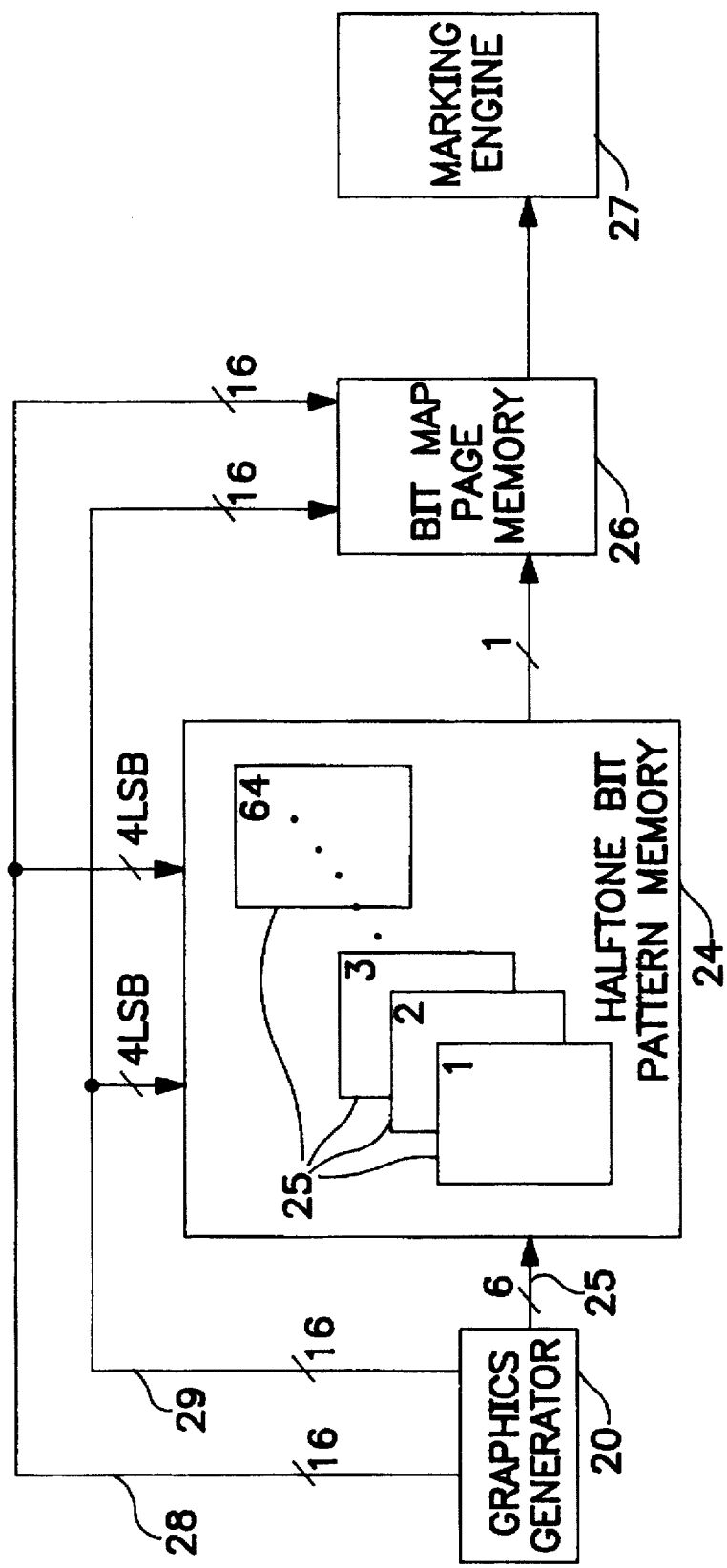
FIG. 6 illustrates the incorporation of resultant matrices created in accordance with the preferred embodiment into a dithering system for outputting images on a bilevel device.

Referring now to FIG. 6, there is shown an apparatus for generating a halftone image utilising the series of bitmaps created with the preferred embodiment. A digital monochrome image composed of pixel values is generated by an input device 20 which can be a scanner device or a personal computer programmed to generate graphical output. The digital image is supplied as six bit pixel values representing one of 64 intensity levels. The x and y location of each pixel on a page is identified by two 16 bit words 28,29. Sixty-four, 16×16 bit half tone dot patterns 22, are generated as previously described and stored in bit pattern memory 24. A six bit level indicator 25 is used to select the requisite level and the lower four bits of the x and y address bits are used to select the relevant bit within a particular level. The output from the halftone bit pattern memory 24 is stored in a page memory 26 at the address specified by the x and y pixel addresses. When the bit map page memory 26 is full, the contents are supplied to a binary marking engine 27 such as a laser or ink jet printing device. Alternatively, if the input is synchronised with the marking engine, the output of the bit pattern memory is supplied to the marking engine without the need for page memory 26.

Appendix 1 included in this specification discloses a C-code program for the creation of a three dimensional matrix, with two dimensions being x and y and the third being the level, in accordance with the above embodiment. The enclosed code relies on a number of library routines, including a number of simulated annealing library routines, developed by the present applicant and utilised by the preferred embodiment and outlined in the manual entry set out in Appendix 2. The annealing codes are themselves set out in Appendix 3.

The foregoing describes only one embodiment of the present invention and modifications, obvious to those skilled in the art, can be made thereto without departing from the scope of the present invention.

For example, different formulations of the objective encompassing the spirit of the invention would be readily apparent to those skilled in the art in addition to different formulations of the weighting functions used in the preferred embodiment.

Additionally, the present invention can be readily applied to the display of colour images through the application of the preferred embodiment to each colour component of the image. Additionally, the extension of the invention to multi-level output devices will also be apparent to those skilled in the art.

APPENDIX 1

```
/*
    ldither.c - generate dither matrix
*/
#include <math.h>
include <stdio.h> include "wnlib.h"
include "wnswap.h"
#include "wnmax.h"
#include "wnabs.h"
#include "wnsqr.h"

define RESTORE    FALSE define SEED       1
define ANNEAL_TIME   10 define BASE_DITHER_MAT "32_18.matrix"
define SAVE_FILE       "32_18.test"

define RESTORE_FILE  SAVE_FILE define LEN_X   (32)
define LEN_Y   (LEN_X)

#define CHECKPOINT_FREQUENCY  (1.0/50.0)

#define JUMP_RADIUS       (3)
#define WINDOW_RADIUS     (7)
#define WINDOW_RADIUS_2  (WINDOW_RADIUS*WINDOW_RADIUS)

#define WEIGHT_STRETCH  (0.10)
#define STRETCH_WIDTH   (0.20)

#define LEVELS      (18)

typedef struct coord_type_struct
{
  int x,y;
} *coord_type;

local int **dither_matrix;  /* dither_matrix[LEN_Y][LEN_X] */
local coord_type ldither_matrix[LEN_Y][LEN_X][LEVELS];
```

```
                                        -17-
   local coord_type inverse_ldither_matrix[LEVELS][LEN_Y][LEN_X];
   local bool pixel_matrix[LEVELS][LEN_Y][LEN_X];

local int level_to_mutate,ix,iy,jx,jy;

5
   local int eval_vect[WINDOW_RADIUS_2];
   local double weight_array[WINDOW_RADIUS_2];

10 local bool write_files_at_checkpoint = FALSE;

local int mod_dist(x1,x2,mod)
15
   int x1,x2,mod;

{
     int dist;
20
     dist = x1-x2;

if(dist < 0)
     {
25     dist = -dist;
     } if(dist > mod/2)
     {
30     dist = mod-dist;
     } return(dist);
   }
35 local int dist_squared(x1,x2,y1,y2)

int x1,x2,y1,y2;
40
   {
     int dist_x,dist_y;

dist_x = mod_dist(x1,x2,LEN_X);
45   dist_y = mod_dist(y1,y2,LEN_Y);

return(wn_square(dist_x)+wn_square(dist_y));
   }
```

-18-

```
local void zero_eval_vect()
{
  wn_blkzero(eval_vect,sizeof(eval_vect));
} local double eval_vect_ob()
{
  int i;
  double sum;

sum = 0.0;

for(i=1;i<WINDOW_RADIUS_2;++i)
  {
    sum += weight_array[i]*eval_vect[i];
  } return(sum);
} local void fill_eval_vect_for_point(pixel_plane,cen_x,cen_y)

bool pixel_plane[LEN_Y][LEN_X];
int cen_x,cen_y;

{
  int start_x,fin_x,start_y,fin_y,x,y;
  int dist_x,dist_x_2,dist_y,dist_y_2,dist_2;
  bool test_val;

test_val = pixel_plane[cen_y][cen_x];

start_x = cen_x-WINDOW_RADIUS;
  fin_x = cen_x+WINDOW_RADIUS;

if(start_x < 0)
  {
    start_x += LEN_X;
  }
  if(fin_x >= LEN_X)
  {
    fin_x -= LEN_X;
  } start_y = cen_y-WINDOW_RADIUS;
  fin_y = cen_y+WINDOW_RADIUS;
```

```
    if(start_y < 0)
    {
      start_y += LEN_Y;
    }
    if(fin_y >= LEN_Y)
    {
      fin_y -= LEN_Y;
    } for(y=start_y;y!=fin_y+1;++y)
    {
      if(y >= LEN_Y)
      {
        y -= LEN_Y;
      } dist_y = mod_dist(y,cen_y,LEN_Y);
      dist_y_2 = dist_y*dist_y;

for(x=start_x;x!=fin_x+1;++x)
      {
        if(x >= LEN_X)
        {
          x -= LEN_X;
        } dist_x = mod_dist(x,cen_x,LEN_X);
        dist_x_2 = dist_x*dist_x;
        dist_2 = dist_x_2 + dist_y_2;

if(dist_2 < WINDOW_RADIUS_2)
        {
            if(test_val == pixel_plane[y][x])
            {
              ++(eval_vect[dist_2]);
            }
        }
      }
    }
} local double fill_eval_vect_for_level(level)
int level;

{
  int x,y;
```

-20-

```
    for(y=0;y<LEN_Y;++y)
    for(x=0;x<LEN_X;++x)
    {
      fill_eval_vect_for_point(pixel_matrix[level],x,y);
    }
  } local double halftone_ob()
  {
    int level;

zero_eval_vect();

for(level=0;level<LEVELS;++level)
    {
      fill_eval_vect_for_level(level);
    } return(eval_vect_ob());
  } local double stretch_weight_for_avg_level(avg_level)

double avg_level;

{
    double fract;

if(avg_level > (LEVELS-1)/2)
    {
      avg_level = (LEVELS-1) - avg_level;
    } fract = avg_level/(LEVELS-1);

wn_assert(fract >= 0.0);
    wn_assert(fract <= 0.5);

fract *= 2.0;

/*
    return(fract);
    return(wn_square(fract));
    return(fract*fract*fract*fract);
    */
    return(wn_cube(fract));
```

-21-
}

```
#if 0
local double stretch_weight_for_diff(diff)

double diff;

{
  diff = wn_abs(diff);
  diff /= (LEVELS-1);

if(diff >= STRETCH_WIDTH)
  {
    return(0.0);
  }
  else
  {
    return(STRETCH_WIDTH-diff);
  }
} local double stretch_weight(level1,level2)

int level1,level2;

{
  return(
          stretch_weight_for_avg_level(((double)(level1+level2))/2.0)
              *
          stretch_weight_for_diff((double)(level1-level2))
        );
} local double stretch_ob_for_pair(level1,level2,x,y)

int level1,level2,x,y;

{
  coord_type c1,c2;
  int error,level_diff;

c1 = ldither_matrix[y][x][level1];
  c2 = ldither_matrix[y][x][level2];

error = dist_squared(c1->x,c2->x,c1->y,c2->y);
```

```
                                        -22-
    level_diff = level1-level2;
    level_diff = wn_abs(level_diff);
    if(level_diff <= 1)
      {
        wn_assert(level_diff == 1);

if(error > 2)
          {
            return(WN_FHUGE);
          }
      } return(stretch_weight(level1,level2)*error);
  } local double stretch_ob_for_point(level,x,y)

int level;
int x,y;

{
    extern double wn_floor();
    coord_type dither_coord;
    int other_level;
    double sum;
    int width,start_level,fin_level;

wn_assert(level >= 0);
    wn_assert(level < LEVELS);

width = (int)wn_floor(STRETCH_WIDTH*(LEVELS-1));
    start_level = level-width;
    fin_level = level+width;
    if(start_level < 0)
      {
        start_level = 0;
      }
    if(fin_level > (LEVELS-1))
      {
        fin_level = LEVELS-1;
      } dither_coord = inverse_ldither_matrix[level][y][x];

sum = 0.0;

for(other_level=start_level;other_level<level;++other_level)
      {
```

-23-
```
       sum += stretch_ob_for_pair(level,other_level,
                                   dither_coord->x,dither_coord->y);
     }
     for(other_level=level+1;other_level<=fin_level;++other_level)
  5  {
       sum += stretch_ob_for_pair(level,other_level,
                                   dither_coord->x,dither_coord->y);
     }

10  sum *= (WEIGHT_STRETCH/(wn_square(STRETCH_WIDTH)*2.0*width));

return(sum);
   }
   #endif
 15 local double stretch_ob_for_pair(level1,level2,x,y)

int level1,level2,x,y;
 20
   {
     coord_type c1,c2;
     int error,level_diff;

25  c1 = ldither_matrix[y][x][level1];
     c2 = ldither_matrix[y][x][level2];

error = dist_squared(c1->x,c2->x,c1->y,c2->y);

30  switch(error)
     {
       case(0):
       case(1):
       case(2):
 35      return(0.0);
       default:
         return(WN_FHUGE);
     }
   }
 40 local double stretch_ob_for_point(level,x,y)

int level;
 45  int x,y;

{
     extern double wn_floor();
     coord_type dither_coord;
```

-24-

```
    int other_level;
    double sum;
    int width,start_level,fin_level;

wn_assert(level >= 0);
    wn_assert(level < LEVELS);

dither_coord = inverse_ldither_matrix[level][y][x];

sum = 0.0;

if(level > 0)
    {
      sum += stretch_ob_for_pair(level,level-1,
                                 dither_coord->x,dither_coord->y);
    }
    if(level < LEVELS-1)
    {
      sum += stretch_ob_for_pair(level,level+1,
                                 dither_coord->x,dither_coord->y);
    } return(sum);
    } local double stretch_ob()
    {
      double sum;
      int level,x,y;

sum = 0.0;

for(level=0;level<LEVELS;++level)
      {
        for(y=0;y<LEN_Y;++y)
        for(x=0;x<LEN_X;++x)
        {
          sum += stretch_ob_for_point(level,x,y);
        }
      } return(sum);
    } local double ldither_ob()
    {
      return(halftone_ob()+stretch_ob());
```

```
        /*
        return(halftone_ob());
        */
    } local double partial_halftone_ob(level,x1,y1,x2,y2)

int level,x1,y1,x2,y2;

{
      zero_eval_vect();

fill_eval_vect_for_point(pixel_matrix[level],x1,y1);
      fill_eval_vect_for_point(pixel_matrix[level],x2,y2);

return(2.0*eval_vect_ob());
    } local double evaluate_random_mutation()
    {
      extern double wn_round(),wn_normal_distribution();
      double delta_ob;
      int delta_x,delta_y;
      coord_type coord_i,coord_j;

level_to_mutate = wn_random_mod_int(LEVELS);

ix = wn_random_mod_int(LEN_X);
      iy = wn_random_mod_int(LEN_Y);

do
      {
        delta_x = wn_random_int_between(-1,2);
        delta_y = wn_random_int_between(-1,2);
      }
      while((delta_x == 0)&&(delta_y == 0));

jx = wn_imod(ix+delta_x,LEN_X);
      jy = wn_imod(iy+delta_y,LEN_Y);

delta_ob = 0.0;
      delta_ob -= 2.0*stretch_ob_for_point(level_to_mutate,ix,iy);
      delta_ob -= 2.0*stretch_ob_for_point(level_to_mutate,jx,jy);
      if(pixel_matrix[level_to_mutate][iy][ix]
         !=
         pixel_matrix[level_to_mutate][jy][jx])
      {
```

-25-

```
                                    -26-
        delta_ob -= partial_halftone_ob(level_to_mutate,ix,iy,jx,jy);
      } coord_i = inverse_ldither_matrix[level_to_mutate][iy][ix];
5     coord_j = inverse_ldither_matrix[level_to_mutate][jy][jx];

wn_swap(ldither_matrix[coord_i->y][coord_i->x][level_to_mutate],
              ldither_matrix[coord_j->y][coord_j->x][level_to_mutate],
              coord_type);
10    wn_swap(inverse_ldither_matrix[level_to_mutate][iy][ix],
              inverse_ldither_matrix[level_to_mutate][jy][jx],
              coord_type);
      wn_swap(pixel_matrix[level_to_mutate][iy][ix],
              pixel_matrix[level_to_mutate][jy][jx],
15            bool);

delta_ob += 2.0*stretch_ob_for_point(level_to_mutate,ix,iy);
      delta_ob += 2.0*stretch_ob_for_point(level_to_mutate,jx,jy);
      if(pixel_matrix[level_to_mutate][iy][ix]
20         !=
         pixel_matrix[level_to_mutate][jy][jx])
      {
        delta_ob += partial_halftone_ob(level_to_mutate,ix,iy,jx,jy);
      }
25
      return(delta_ob);
    }

30  local void accept_mutation()
    {
    /*
    printf(".");
    fflush(stdout);
35  */
    } local void reject_mutation()
40  {
      coord_type coord_i,coord_j;

/*
      printf("-");
45    fflush(stdout);
      */ coord_i = inverse_ldither_matrix[level_to_mutate][iy][ix];
      coord_j = inverse_ldither_matrix[level_to_mutate][jy][jx];
```

-27-

```
    wn_swap(ldither_matrix[coord_i->y][coord_i->x][level_to_mutate],
            ldither_matrix[coord_j->y][coord_j->x][level_to_mutate],
            coord_type);
    wn_swap(inverse_ldither_matrix[level_to_mutate][iy][ix],
            inverse_ldither_matrix[level_to_mutate][jy][jx],
            coord_type);
    wn_swap(pixel_matrix[level_to_mutate][iy][ix],
            pixel_matrix[level_to_mutate][jy][jx],
            bool);
} local void write_ldither_matrix(filename)

char filename[];

{
  FILE *f;
  int level,x,y;

f = fopen(filename,"w");

fprintf(f,"{\n");

for(level=0;level<LEVELS;++level)
  {
    if(level > 0)
    {
      fprintf(f,",\n");
    } fprintf(f,"  {\n");

for(y=0;y<LEN_Y;++y)
    {
      if(y > 0)
      {
          fprintf(f,",\n");
      } fprintf(f,"    {");

for(x=0;x<LEN_X;++x)
      {
          if(x > 0)
          {
            fprintf(f,",");
          }
```

-28-

```
            fprintf(f," %d",pixel_matrix[level][y][x]);
          }
       fprintf(f,"}");
     }
     fprintf(f,"\n }");
   }
   fprintf(f,"\n}\n");

fclose(f);
 } local void write_files()
 {
   char filename[50];

sprintf(filename,"%s.lmatrix",SAVE_FILE);

write_ldither_matrix(filename);

printf("files written\n");
   fflush(stdout);
 } local void verify_pixel_matrix()
 {
   int level,x,y,dither_level;
   coord_type coord;

for(y=0;y<LEN_Y;++y)
   for(x=0;x<LEN_X;++x)
   {
     dither_level = dither_matrix[y][x];

for(level=0;level<=dither_level;++level)
     {
       coord = ldither_matrix[y][x][level];

wn_assert(pixel_matrix[level][coord->y][coord->x] == FALSE);
     }
     for(;level<LEVELS;++level)
     {
       coord = ldither_matrix[y][x][level];
```

```
                                    -29-
        wn_assert(pixel_matrix[level][coord->y][coord->x] == TRUE);
      }
     }
    } local void verify_ldither_matrix_and_inverse()
    {
      int level,x,y;
      coord_type coord;

for(level=0;level<LEVELS;++level)
      for(y=0;y<LEN_Y;++y)
      for(x=0;x<LEN_X;++x)
      {
        coord = inverse_ldither_matrix[level][y][x];

wn_assert(ldither_matrix[coord->y][coord->x][level]->x == x);
        wn_assert(ldither_matrix[coord->y][coord->x][level]->y == y);
      }
    } local void verify_state()
    {
      verify_pixel_matrix();
      verify_ldither_matrix_and_inverse();
    } local void checkpoint()
    {
      double ob;

verify_state();

wn_anneal_std_checkpoint_print();

/*
    */
      if(
          write_files_at_checkpoint
               ||
          wn_true_with_probability(CHECKPOINT_FREQUENCY)
        )
      {
        ob = ldither_ob();
        printf("ob = %lf\n",ob);
        printf("ob/count = %lf\n",ob/(LEVELS*LEN_X*LEN_Y));
```

```
                                    -30-
        fflush(stdout);

write_files();
    }
 5
    write_files_at_checkpoint = FALSE;
    }

10  local void print_status()
    {
    #if RESTORE
      printf("restoring previous anneal.\n");
    #else
15    printf("starting new anneal.\n");
    #endif
      printf("3-dimensional dither cell anneal\n");
      printf("save_file    = <%s>\n",SAVE_FILE);
    #if RESTORE
20    printf("restore_file = <%s>\n",RESTORE_FILE);
    #endif
      printf("base_dither_matrix = <%s>\n",BASE_DITHER_MAT);
      printf("random number seed = %d\n",SEED);
      printf("anneal time = %d\n",ANNEAL_TIME);
25    printf("matrix dimensions = (%d,%d)\n",LEN_X,LEN_Y);
      printf("levels = %d\n",LEVELS);
      printf("window radius = %d\n",WINDOW_RADIUS);

printf("\n\n");
30
      fflush(stdout);
    }

35  local double base_compute_weight(dist2)

int dist2;

{
40    extern double exp(),pow(),sqrt();

if(dist2 == 0)
      {
        return(0.0);
45    }
      else
      {
        return(1.0/sqrt((double)dist2));
      }
```

-31-
```
    } local double compute_weight(dist2)
    int dist2;

{
      return(base_compute_weight(dist2)-base_compute_weight(WINDOW_RADIUS_2));
    } local void compute_weight_array()
    {
      int x,y,dist2;

for(dist2=1;dist2<WINDOW_RADIUS_2;++dist2)
      {
        weight_array[dist2] = compute_weight(dist2);
      } weight_array[0] = 0.0;
    } local void set_write_files_at_checkpoint()
    {
      write_files_at_checkpoint = TRUE;
    } local void sleep_on_kill()
    {
      sleep(3*60*60);   /* sleep for 3 hours */
    } local void setup_signals()
    {
      signal(30,(set_write_files_at_checkpoint));

signal(15,(sleep_on_kill));
      signal(3,(sleep_on_kill));
    } local void initialize()
    {
      setup_signals();
```

```
  compute_weight_array();
} local void set_up_ldither_matrix()
{
  int len_x,len_y;
  int level,x,y,dither_level;
  coord_type coord;

read_dither_mat(BASE_DITHER_MAT,&dither_matrix,&len_x,&len_y);

wn_assert(len_x == LEN_X);
  wn_assert(len_y == LEN_Y);

for(y=0;y<LEN_Y;++y)
  for(x=0;x<LEN_X;++x)
  {
    dither_level = dither_matrix[y][x];

for(level=0;level<=dither_level;++level)
    {
      pixel_matrix[level][y][x] = FALSE;
    }
    for(;level<LEVELS;++level)
    {
      pixel_matrix[level][y][x] = TRUE;
    }
  } for(y=0;y<LEN_Y;++y)
  for(x=0;x<LEN_X;++x)
  for(level=0;level<LEVELS;++level)
  {
    coord = wn_znew(coord_type);

coord->x = x;
    coord->y = y;

ldither_matrix[y][x][level] = coord;
    inverse_ldither_matrix[level][y][x] = coord;
  }
}

/*
The main routine for generating a dither matrix from scratch.
*/
```

-33-

```
    void test_dither()
    {
      initialize();

5   set_up_ldither_matrix();

printf("matrix created.\n");
      fflush(stdout);

10    printf("ob = %lf\n",ldither_ob());
      printf("starting anneal....\n");
      fflush(stdout);

write_files_at_checkpoint = TRUE;
15
    #if 0
      wn_anneal((evaluate_random_mutation),(accept_mutation),(reject_mutation),
            (checkpoint),
            LEVELS*LEN_X*LEN_Y,
20          6000,
            ANNEAL_TIME
            );
    #endif
      wn_anneal_from_temperature(
25          (evaluate_random_mutation),(accept_mutation),(reject_mutation),
            (checkpoint),
              /*
              20,
              LEN_X*LEN_Y,
30            */
            LEVELS*LEN_X*LEN_Y,
            6*LEVELS*LEN_X*LEN_Y,
            ANNEAL_TIME,
              /*0.20*/
35            /*0.04*/
              /*0.02*/
              /*0.01*/
              0.00
            );
40
      write_files_at_checkpoint = TRUE;
      checkpoint();
    }

45
    void main()
    {
      wn_gpmake("general_free");
```

```
        print_status();

wn_seed_random_number_generator(SEED);

#if RESTORE
        /* continue making a previously started dither matrix */
        restore_dither();
    #else
        /* generate a dither matrix from scratch */
        test_dither();
    #endif
    }
```

(END OF APPENDIX 1)

-35-
APPENDIX 2

NAME
anneal -- simulated annealing package

SYNOPSIS
```
void anneal(pevaluate_random_mutation,paccept_mutation,preject_mutation,
       pcheckpoint,
       problem_size,node_degree,epochs_to_run)
   double (*pevaluate_random_mutation)();
   void (*paccept_mutation)(),(*preject_mutation)();
   void (*pcheckpoint)();
   long unsigned int problem_size,node_degree,epochs_to_run;

void anneal_from_temperature(pevaluate_random_mutation,
             paccept_mutation,preject_mutation,
             pcheckpoint,
             problem_size,node_degree,epochs_to_run,
             start_temp)
   double (*pevaluate_random_mutation)();
   void (*paccept_mutation)(),(*preject_mutation)();
   void (*pcheckpoint)();
   long unsigned int problem_size,node_degree,epochs_to_run;
   double start_temp;
```

DESCRIPTION
This package provides a general simulated annealing [1] algorithm for use on complex combinatorial optimization problems. Simulated annealing is a technique of last resort, and should be used only when other techniques, such as linear programming (see wnsplx), and domain-specific algorithms, have not born fruit. Generally, simulated annealing is of value only with combinatorial optimization problems that are NP-complete [2], and even with these, approximation methods involving the above techniques are often superior.

"anneal" provides a complete simulated annealing optimization algorithm. It first computes a start temperature which leaves the system near its maximum entropy state. "anneal" runs for "epochs_to_run" epochs, decreasing the temperature linearly to 0. Once the system reachs 0 temperature, it is annealed until stuck in a local minimum. Whether or not the system is stuck in a local minimum is determined using "node_degree". It is often useful (for speed reasons) to terminate the run before stuck in a local minimum (using ^C from the keyboard).

An "epoch" is "problem_size" acceptances. At each acceptance, the temperature is decreased by a fixed amount; the amount is chosen to make the temperature 0 after "epochs_to_run" epochs. Temperature is not decreased at rejections.

"anneal_from_temperature" works the same way as "anneal" except that the start temperature is set by the user-supplied argument "start_temp".

-36-

Mutations are selected randomly and saved by the user-supplied routine "(*pevaluate_random_mutation)()". (*pevaluate_random_mutation)() returns the amount of change in the objective function that the mutation would produce if it were accepted.

5      (*paccept_mutation)() is a user-supplied routine which accepts the mutation produced by the most recent call to (*pevaluate_random_mutation)(). (*paccept_mutation)() is frequently a do-nothing routine.

10     (*preject_mutation)() is a user-supplied routine which rejects the mutation produced by the most recent call to (*pevaluate_random_mutation)(). Calling (*preject_mutation)() restores the system state to its condition before the most recent call to (*pevaluate_random_mutation)().

15     (*pcheckpoint)() is a user-supplied routine which is called a few times in every epoch. It normally recomputes the objective function of the system from scratch (to avoid error buildup from repeated incremental objective function calculations), prints some status info about the optimization to stderr, and saves the current solution to a file (so that if the system crashes, the current solution will not be lost).
20     (*pcheckpoint)() is also called when the optimization completes. "anneal" and "anneal_from_temperature" print various information concerning the progress of the anneal to stderr immediately before calling (*pcheckpoint)().

"problem_size" is a parameter which specifies the number of variables in the
25     problem to be optimized.

"node_degree" specifies the average number of mutations which are possible from a state. It is the approximate degree of the state space graph. "node_degree" is used to decide when a local minimum has been achieved.

30     "epochs_to_run" specifies the amount of time the anneal is to run for. More time results in better solutions.

Simulated annealing finds a good solution to an optimization problem as follows.
35     The problem is presented, together with a feasible (legal) solution. This solution might be randomly generated or it might be generated by some other optimization algorithm. Mutations (small, incremental changes) are applied to this solution, hopefully improving it, until the algorithm terminates and a good solution is reached.

40     Mutations are selected randomly; some are accepted, some are not. Decrease in the objective function is improvement; increase is degradation. All improvements or zero-changes (non-degradations) are immediately accepted. To avoid the algorithm getting stuck in local minima too soon, degradations are sometimes accepted, with probability equal to:
45                  prob = exp(-delta/temperature)
       where "delta" is the change in objective function produced by the mutation. The "temperature" decreases by a fixed amount each time a mutation is accepted. Temperature starts at some medium to large initial value and falls throughout the run

-37- toward 0. At the end, temperature == 0. At temperature == 0, no degrading mutations are accepted.

RESOURCES
   All these routines run with

AVERAGE CASE:

time = epochs_to_run*problem_size*
       < time for slowest caller-supplied routine > /
       < average acceptance rate >
   stack memory = 1
   dynamic memory = 0 where "epochs_to_run" and "problem_size" are arguments to the routines.

The number of iterations required for "anneal" and "anneal_from_temperature" to reach optimal or good solutions is problem specific and very difficult to predict in advance. Generally, simulated annealing based algorithms are much faster than exhaustive search and variations on exhaustive search, such as random search and "branch and bound". If time is limited, simulated annealing generally finds much better solutions than these techniques.

BUGS

SEE ALSO
   wnrnd, wnsplx

REFERENCES
   [1] Kirkpatrick, S., Gelatt, C.D., Jr., and Vecchi, M.P. (1983)
       Optimization by simulated annealing, Science 220(4598), 671-680.

[2] Garey & Johnson: Computers and Intractability — A Guide to the
       Theory of NP-Completeness, W.H. Freeman & Co, San Francisco, 1979.

(END OF APPENDIX 2)

-38-
APPENDIX 3

```
/**************************************************** void anneal_from_temperature(pevaluate_random_mutation,
            paccept_mutation,preject_mutation,
            pcheckpoint,
            problem_size,node_degree,epochs_to_run,start_temp)

void anneal(pevaluate_random_mutation,
            paccept_mutation,preject_mutation,
            pcheckpoint,
            problem_size,node_degree,epochs_to_run)

void annealw_from_temperature(pevaluate_random_mutation,
            paccept_mutation,preject_mutation,
            pcheckpoint,
            problem_size,acceptance_rate,epochs_to_run,start_temp)

void annealw(pevaluate_random_mutation,
            paccept_mutation,preject_mutation,
            pcheckpoint,
            problem_size,acceptance_rate,epochs_to_run)

void anneal_vector_from_temperature(solution_vect,sdev_vect,
                            peval_mutation,
                            paccept_mutation,preject_mutation,
                            pcheckpoint,
                            len,epochs_to_run,start_temp)

****************************************************/
#include <math.h>
include <stdio.h> include "wnlib.h"

extern bool force_optimize_stop_flag;

void anneal_linear_temperature(pevaluate_random_mutation,
        paccept_mutation,preject_mutation,
        pcheckpoint,
        problem_size,node_degree,epochs_to_run,start_temp,fin_temp)

double (*pevaluate_random_mutation)();
void (*paccept_mutation)(),(*preject_mutation)();
```

-39-

```
   void (*pcheckpoint)();
   long unsigned int problem_size,node_degree,epochs_to_run;
   double start_temp,fin_temp;

5  {
     long unsigned int i,epoch,epoch_length,
                no_move_count,zero_move_count,
                since_checkpoint_count,accept_count;
     double temp,delta_temp,
10          delta,accum_objective,
            prob_acceptance;

force_optimize_stop_flag = FALSE;

15   accum_objective = 0.0;
     epoch_length = problem_size;
     temp = start_temp;
     delta_temp = (start_temp-
     fin_temp)/(((double)epoch_length)*((double)epochs_to_run));

20   accept_count = 0;
     no_move_count = 0;
     zero_move_count = 0;
     since_checkpoint_count = epoch_length;  /* checkpoint at start */

25   for(epoch=0;epoch<epochs_to_run;++epoch)
     for(i=0;i<epoch_length;++i)
     {
       while(TRUE)
30     {
         ++since_checkpoint_count;

if(since_checkpoint_count >= epoch_length)
         {
35         printf("\n");
           printf("anneal_linear_temperature: epochs_remaining=%ld out of %ld\n",
               epochs_to_run-epoch,epochs_to_run);
           printf("anneal_linear_temperature: temperature=%lf\n",temp);
           printf("anneal_linear_temperature: accept_rate=%lf\n",
40             ((double)accept_count)/(double)since_checkpoint_count);
           printf("anneal_linear_temperature: objective=%lf\n",accum_objective);

(*pcheckpoint)();

45         fflush(stdout);

since_checkpoint_count = 0;
           accept_count = 0;
         }
```

```
                                            -40- delta = (*pevaluate_random_mutation)();

if(delta < 0.0)
  5     {
          zero_move_count = 0;
          break;
        }
        else if(delta == 0.0)
 10     {
          ++zero_move_count;
          break;
        }
        else /* delta > 0.0 */
 15     {
          if(temp > 0.0)
          {
            prob_acceptance = exp(-delta/temp);

20         if(wn_true_with_probability(prob_acceptance))
            {
              zero_move_count = 0;
              break;
            }
 25       }
        }

(*preject_mutation)();
        ++no_move_count;
 30
        if(
            force_optimize_stop_flag
            ||
            (no_move_count >= node_degree)
 35         ||
            (zero_move_count >= node_degree)
          )
        {
          printf("\n");
 40       printf("anneal_linear_temperature: TERMINATING\n");
          printf("anneal_linear_temperature: temperature = %lf\n",temp);
          printf("anneal_linear_temperature: accept_rate = %lf\n",
                ((double)accept_count)/(double)since_checkpoint_count);
          printf("anneal_linear_temperature: objective = %lf\n",
 45           accum_objective);

(*pcheckpoint)();

fflush(stdout);
```

-41-

```
           force_optimize_stop_flag = FALSE;
           return;
         }
    } /* while(TRUE) */

(*paccept_mutation)();
    accum_objective += delta;

no_move_count = 0;
    ++accept_count;

temp -= delta_temp;
    if(temp < 0.0)
    {
      temp = 0.0;
    }
    } /* for(i=0;i<epoch_length;++i) */
      /* for(epoch=0;epoch<epochs_to_run;++epoch) */ printf("\n");
    printf("anneal_linear_temperature: TERMINATING\n");
    printf("anneal_linear_temperature: temperature= %lf\n",temp);
    printf("anneal_linear_temperature: accept_rate= %lf\n",
        ((double)accept_count)/(double)since_checkpoint_count);
    printf("anneal_linear_temperature: objective= %lf\n",
        accum_objective);

(*pcheckpoint)();

fflush(stdout);

return;
  } void anneal_from_temperature(pevaluate_random_mutation,
          paccept_mutation,preject_mutation,
          pcheckpoint,
          problem_size,node_degree,epochs_to_run,start_temp)

double (*pevaluate_random_mutation)();
    void (*paccept_mutation)(),(*preject_mutation)();
    void (*pcheckpoint)();
    long unsigned int problem_size,node_degree,epochs_to_run;
    double start_temp;

{
    long unsigned int i,epoch,epoch_length,
```

```
                        -42-
            no_move_count,zero_move_count,
            since_checkpoint_count,accept_count;
        double temp,delta_temp,
            delta,accum_objective,best_checkpoint_objective,
 5          prob_acceptance;

force_optimize_stop_flag = FALSE;

best_checkpoint_objective = WN_FHUGE;
10      accum_objective = 0.0;
        epoch_length = problem_size;
        temp = start_temp;
        delta_temp = start_temp/(((double)epoch_length)*((double)epochs_to_run));

15      accept_count = 0;
        no_move_count = 0;
        zero_move_count = 0;
        since_checkpoint_count = epoch_length;  /* checkpoint at start */

20      for(epoch=0;;++epoch)
        for(i=0;i<epoch_length;++i)
        {
          while(TRUE)
          {
25          ++since_checkpoint_count;

if(
               (since_checkpoint_count >= epoch_length)
                 &&
30             (accum_objective < best_checkpoint_objective)
              )
            {
              printf("\n");
              printf("anneal_from_temperature: epochs_remaining= %ld out of %ld\n",
35                epochs_to_run-epoch,epochs_to_run);
              printf("anneal_from_temperature: temperature= %lf\n",temp);
              printf("anneal_from_temperature: accept_rate= %lf\n",
                  ((double)accept_count)/(double)since_checkpoint_count);
              printf("anneal_from_temperature: objective= %lf\n",accum_objective);
40
              (*pcheckpoint)();
              best_checkpoint_objective = accum_objective;

fflush(stdout);
45
              since_checkpoint_count = 0;
              accept_count = 0;
            }
```

```
                                                     -43-
          delta = (*pevaluate_random_mutation)();

if(delta < 0.0)
          {
  5         zero_move_count = 0;
            break;
          }
          else if(delta == 0.0)
          {
 10         ++zero_move_count;
            break;
          }
          else /* delta > 0.0 */
          {
 15         if(temp > 0.0)
            {
              prob_acceptance = exp(-delta/temp);

if(wn_true_with_probability(prob_acceptance))
 20           {
                zero_move_count = 0;
                break;
              }
            }
 25       }

(*preject_mutation)();
          ++no_move_count;

30       if(
              force_optimize_stop_flag
                ||
              (no_move_count >= node_degree)
                ||
 35           (zero_move_count >= node_degree)
             )
          {
            if(accum_objective < best_checkpoint_objective)
            {
 40           (*pcheckpoint)();
              best_checkpoint_objective = accum_objective;
            } printf("\n");
 45         printf("anneal_from_temperature: TERMINATING\n");
            printf("anneal_from_temperature: temperature=%lf\n",temp);
            printf("anneal_from_temperature: accept_rate=%lf\n",
                   ((double)accept_count)/(double)since_checkpoint_count);
            printf("anneal_from_temperature: objective=%lf\n",
```

```
                                    -44-
               best_checkpoint_objective);

fflush(stdout);

5       force_optimize_stop_flag = FALSE;
         return;
       }
     } /* while(TRUE) */

10     (*paccept_mutation)();
       accum_objective += delta;

no_move_count = 0;
       ++accept_count;
15
       temp -= delta_temp;
       if(temp < 0.0)
       {
         temp = 0.0;
20     }
     } /* for(i=0;i<epoch_length;++i) */
     /* for(epoch=0;TRUE;++epoch) */
   }

25
   void anneal(pevaluate_random_mutation,paccept_mutation,preject_mutation,
           pcheckpoint,
           problem_size,node_degree,epochs_to_run)

30 double (*pevaluate_random_mutation)();
   void (*paccept_mutation)(),(*preject_mutation)();
   void (*pcheckpoint)();
   long unsigned int problem_size,node_degree,epochs_to_run;

35 {
     long int i,epoch_length;
     double start_temp,sum,sum2,delta;

epoch_length = problem_size;
40
     /* randomize problem and measure standard deviation */
     printf("anneal: randomizing.\n");
     fflush(stdout);
     sum = sum2 = 0.0;
45   for(i=0;i<epoch_length;++i)
     {
       delta = (*pevaluate_random_mutation)();
       sum += delta;
       sum2 += delta*delta;
```

```
        (*paccept_mutation)();
    }
    printf("anneal: finished randomizing.\n");
    fflush(stdout);

sum /= (double)epoch_length;
    sum2 /= (double)epoch_length;

start_temp = sqrt(sum2-sum*sum);

anneal_from_temperature(pevaluate_random_mutation,
          paccept_mutation,preject_mutation,
          pcheckpoint,
          problem_size,node_degree,epochs_to_run,start_temp);
} if 0
/* works only for x >= 0.0 */
local double log_erfc(x)

double x;

{
    double t;

wn_assert(x >= 0.0);

t = 1.0/(1.0+0.5*x);

return(log(t)-x*x-1.26551223+t*(1.00002368+t*(0.37409196+t*(0.09678418+
        t*(-0.18628806+t*(0.27886807+t*(-1.13520398+t*(1.48851587+
        t*(-0.82215223+t*0.17087277)))))))));
} local double log_normal_integral(x)

double x;

{
    static double div_square_root_of_2,log_2;
    static bool initialized = FALSE;

if(not(initialized))
    {
        div_square_root_of_2 = 1.0/sqrt(2.0);
        log_2 = log(2.0);
```

```
        initialized = TRUE;
      } return(log_erfc(div_square_root_of_2*x)-log_2);
    } local double acceptance_rate_function(window_size)
    double window_size;

{
      wn_assert(window_size >= 0.0);

return(2.0*exp(window_size*window_size/8.0+
              log_normal_integral(window_size/2.0)));
    } local void merit_function(pmerit,pacceptance_rate,
                    window_size,accept_div_reject_cost)

double *pmerit,*pacceptance_rate;
    double window_size,accept_div_reject_cost;

{
      double movement,cost;

*pacceptance_rate = acceptance_rate_function(window_size);

movement = (*pacceptance_rate)*window_size*window_size;
      cost = (*pacceptance_rate)*accept_div_reject_cost+
          (1.0-(*pacceptance_rate));
      *pmerit = movement/cost;
    } local void compute_optimal_acceptance_rate(pacceptance_rate,
                        accept_div_reject_cost)

double *pacceptance_rate;
    double accept_div_reject_cost;

{
      double window_size,best_window_size,start,fin,
          merit,best_merit,
          acceptance_rate;

best_merit = 0.0;
```

-46-

-47-

```c
for(window_size=1.0;;window_size+ =1.0)
{
  merit_function(&merit,&acceptance_rate,
            window_size,accept_div_reject_cost);

if(merit > best_merit)
    {
    best_merit = merit;
    best_window_size = window_size;
    *pacceptance_rate = acceptance_rate;
    }
  else
    {
    break;
    }
} start = best_window_size-0.95;
fin = best_window_size+0.95;

for(window_size=start;window_size< =fin;window_size+ =0.05)
{
  merit_function(&merit,&acceptance_rate,
            window_size,accept_div_reject_cost);

if(merit > best_merit)
    {
    best_merit = merit;
    *pacceptance_rate = acceptance_rate;
    }
  }
}
endif void annealw_from_temperature(pevaluate_random_mutation,
      paccept_mutation,preject_mutation,
      pcheckpoint,
      problem_size,acceptance_rate,epochs_to_run,start_temp)

double (*pevaluate_random_mutation)(/*window_size*/);
void (*paccept_mutation)(),(*preject_mutation)();
void (*pcheckpoint)();
long unsigned int problem_size,epochs_to_run;
double acceptance_rate,start_temp;

{
  long int i,epoch,epoch_length,no_move_count,
```

```
            -48-
        since_checkpoint_count,accept_count;
    double temp,delta_temp,
        delta,accum_objective,best_checkpoint_objective,
        prob_acceptance,window_size,
        accept_window_increment,reject_window_decrement;

force_optimize_stop_flag = FALSE;

best_checkpoint_objective = WN_FHUGE;
    accum_objective = 0.0;
    epoch_length = 4*problem_size*log((double)problem_size);
    temp = start_temp;
    delta_temp = start_temp/(((double)epoch_length)*((double)epochs_to_run));

window_size = 1.0;
    accept_window_increment = exp(0.05*(1.0-acceptance_rate));
    reject_window_decrement = exp(-0.05*acceptance_rate);

accept_count = 0;
    no_move_count = 0;
    since_checkpoint_count = epoch_length;  /* checkpoint at start */ for(epoch=0;epoch<epochs_to_run;++epoch)
    for(i=0;i<epoch_length;++i)
    {
      while(TRUE)
      {
        ++since_checkpoint_count;

if(force_optimize_stop_flag)
        {
          if(accum_objective < best_checkpoint_objective)
          {
            (*pcheckpoint)();
            best_checkpoint_objective = accum_objective;
          } printf("\n");
          printf("annealw_from_temp: TERMINATING\n");
          printf("annealw_from_temp: window_size=%lf\n",window_size);
          printf("annealw_from_temp: temperature=%lf\n",temp);
          printf("annealw_from_temperature: accept_rate=%lf\n",
              ((double)accept_count)/(double)since_checkpoint_count);
          printf("annealw_from_temp: objective=%lf\n",best_checkpoint_objective);

fflush(stdout);

force_optimize_stop_flag = FALSE;
          return;
```

```
                             -49-
      }
      if(
         (since_checkpoint_count > = epoch_length)
            &&
 5       (accum_objective < best_checkpoint_objective)
      )
      {
        printf("\n");
        printf("annealw_from_temperature: epochs_remaining= %ld out of %ld\n",
10          epochs_to_run-epoch,epochs_to_run);
        printf("annealw_from_temp: window_size= %lf\n",window_size);
        printf("annealw_from_temperature: temperature= %lf\n",temp);
        printf("annealw_from_temperature: accept_rate= %lf\n",
            ((double)accept_count)/(double)since_checkpoint_count);
15      printf("annealw_from_temperature: objective= %lf\n",accum_objective);

(*pcheckpoint)();
        best_checkpoint_objective = accum_objective;

20      fflush(stdout);

since_checkpoint_count = 0;
        accept_count = 0;
      }
25
      delta = (*pevaluate_random_mutation)(window_size);

if(delta < = 0.0)
      {
30       break;
      }
      else /* delta > 0.0 */
      {
        if(temp > 0.0)
35      {
          prob_acceptance = exp(-delta/temp);

if(wn_true_with_probability(prob_acceptance))
          {
40         break;
          }
        }
      }

45    (*preject_mutation)();
      + +no_move_count;
      window_size *= reject_window_decrement;

if(
```

```
                                          -50-
        force_optimize_stop_flag
          ||
        (no_move_count >= epoch_length)
      )
 5    {
        if(accum_objective < best_checkpoint_objective)
        {
          (*pcheckpoint)();
          best_checkpoint_objective = accum_objective;
10      } printf("\n");
        printf("annealw_from_temp: TERMINATING\n");
        printf("annealw_from_temp: window_size= %lf\n",window_size);
15      printf("annealw_from_temp: temperature= %lf\n",temp);
        printf("annealw_from_temperaure: accept_rate= %lf\n",
              ((double)accept_count)/(double)since_checkpoint_count);
        printf("annealw_from_temp: objective= %lf\n",best_checkpoint_objective);

20      fflush(stdout);

force_optimize_stop_flag = FALSE;
        return;
      }
25    } /* while(TRUE) */

(*paccept_mutation)();
      accum_objective += delta;

30    no_move_count = 0;
      ++accept_count;
      window_size *= accept_window_increment;
      if(window_size > 1.0)
      {
35      window_size = 1.0;
      } temp -= delta_temp;
      if(temp < 0.0)
40    {
        temp = 0.0;
      }
    } /* for(i=0;i<epoch_length;++i) */
    /* for(epoch=0;TRUE;++epoch) */
45
    if(accum_objective < best_checkpoint_objective)
    {
      (*pcheckpoint)();
      best_checkpoint_objective = accum_objective;
```

```
        } printf("\n");
        printf("annealw_from_temp: TERMINATING\n");
    5   printf("annealw_from_temp: window_size=%lf\n",window_size);
        printf("annealw_from_temp: temperature=%lf\n",temp);
        printf("annealw_from_temperature: accept_rate=%lf\n",
            ((double)accept_count)/(double)since_checkpoint_count);
        printf("annealw_from_temp: objective=%lf\n",best_checkpoint_objective);
   10
        fflush(stdout);
    }

15   void annealw(pevaluate_random_mutation,
                paccept_mutation,preject_mutation,
                pcheckpoint,
                problem_size,acceptance_rate,epochs_to_run)

20   double (*pevaluate_random_mutation)(/*window_size*/);
        void (*paccept_mutation)(),(*preject_mutation)();
        void (*pcheckpoint)();
        long unsigned int problem_size,epochs_to_run;
        double acceptance_rate;
   25
        {
          long int i,epoch_length;
          double start_temp,sum,sum2,delta;

30     epoch_length = 4*problem_size*log((double)problem_size);

/* randomize problem and measure standard deviation */
          printf("annealw: randomizing.\n");
          fflush(stdout);
   35     sum = sum2 = 0.0;
          for(i=0;i<epoch_length;++i)
          {
            delta = (*pevaluate_random_mutation)(1.0);
            sum += delta;
   40       sum2 += delta*delta;
            (*paccept_mutation)();
          }
          printf("annealw: finished randomizing.\n");
          fflush(stdout);
   45
          sum /= (double)epoch_length;
          sum2 /= (double)epoch_length;

start_temp = sqrt(sum2-sum*sum);
```

-52-

```
        annealw_from_temperature(pevaluate_random_mutation,
                paccept_mutation,preject_mutation,
                pcheckpoint,
                problem_size,acceptance_rate,epochs_to_run,start_temp);
    } define VECTOR_ACCEPTANCE_RATE  (0.455)
    /*
    #define ATTACK_RATE    (0.00)
    #define ATTACK_RATE    (0.01)
    */
    #define ATTACK_RATE    (0.30)

void anneal_vector_from_temperature(solution_vect,sdev_vect,
                            peval_mutation,
                            paccept_mutation,preject_mutation,
                            pcheckpoint,
                            len,epochs_to_run,start_temp)

double solution_vect[],sdev_vect[];
    double (*peval_mutation)(/*new_vector,old_vector,var_changed*/);
    void (*paccept_mutation)(/*new_vector,old_vector,var_changed*/);
    void (*preject_mutation)(/*new_vector,old_vector,var_changed*/);
    void (*pcheckpoint)(/*vector*/);
    long unsigned int len,epochs_to_run;
    double start_temp;

{
        extern double wn_normal_distribution();
        static bool first_checkpoint = TRUE;
        long unsigned int i,epoch,epoch_length,
                since_checkpoint_count,var_changed,accept_count;
        double *vect,*new_vect,temp,delta_temp,
            delta_value,delta,accum_objective,best_checkpoint_objective,
            prob_acceptance,
            accept_sdev_increment,reject_sdev_decrement,sdev_sum;

wn_gpmake("no_free");

force_optimize_stop_flag = FALSE;

wn_make_vect(&vect,len);
        wn_make_vect(&new_vect,len);
        wn_copy_vect(vect,solution_vect,len);
        wn_copy_vect(new_vect,solution_vect,len);
```

```
                                        -53-
    best_checkpoint_objective = WN_FHUGE;
    accum_objective = 0.0;
    epoch_length = len;
    temp = start_temp;
 5  delta_temp = start_temp/(((double)epoch_length)*((double)epochs_to_run));

accept_sdev_increment = exp(ATTACK_RATE*(1.0-
    VECTOR_ACCEPTANCE_RATE));
    reject_sdev_decrement = exp(-
10  ATTACK_RATE*VECTOR_ACCEPTANCE_RATE);

sdev_sum = 0.0;
    accept_count = 0;
    since_checkpoint_count = epoch_length;  /* checkpoint at start */
15
    for(epoch=0;epoch<epochs_to_run;++epoch)
    for(i=0;i<epoch_length;++i)
    {
      while(TRUE)
20    {
        if(force_optimize_stop_flag)
        {
          goto terminate;
        }
25
        ++since_checkpoint_count;

if(
           (since_checkpoint_count >= epoch_length)
30         &&
           (accum_objective < best_checkpoint_objective)
        )
        {
          printf("\n");
35        printf("anneal_vector_from_temperature: epochs_remaining=%ld out of %ld\n",
              epochs_to_run-epoch,epochs_to_run);
          printf("anneal_vector_from_temperature: temperature=%lf\n",temp);
          printf("anneal_vector_from_temperature: accept_rate=%lf\n",
              ((double)accept_count)/(double)since_checkpoint_count);
40        printf("anneal_vector_from_temperature: average sdev=%lf\n",
              sdev_sum/(double)since_checkpoint_count);
          printf("anneal_vector_from_temperature: objective=%lf\n",accum_objective);

wn_copy_vect(solution_vect,vect,len);
45        (*pcheckpoint)(solution_vect);
          best_checkpoint_objective = accum_objective;

fflush(stdout);
```

```
            sdev_sum = 0.0;                     -54-
            accept_count = 0;
            since_checkpoint_count = 0;
            first_checkpoint = FALSE;
  5       } var_changed = wn_random_mod_int(len);
          sdev_sum += sdev_vect[var_changed];
          delta_value = sdev_vect[var_changed]*wn_normal_distribution();
 10       new_vect[var_changed] += delta_value;
          delta = (*peval_mutation)(new_vect,vect,var_changed);

if(delta <= 0.0)
          {
 15         /* accept mutation */
            break;
          }
          else /* delta > 0.0 */
          {
 20         if(temp > 0.0)
            {
              prob_acceptance = exp(-delta/temp);

if(wn_true_with_probability(prob_acceptance))
 25           {
                /* accept mutation */
                break;
              }
            }
 30       }

(*preject_mutation)(new_vect,vect,var_changed);
          new_vect[var_changed] = vect[var_changed];
          sdev_vect[var_changed] *= reject_sdev_decrement;
 35     } /* while(TRUE) */

(*paccept_mutation)(new_vect,vect,var_changed);
        vect[var_changed] = new_vect[var_changed];
        accum_objective += delta;
 40
        ++accept_count;
        sdev_vect[var_changed] *= accept_sdev_increment;

temp -= delta_temp;
 45     if(temp < 0.0)
        {
          temp = 0.0;
        }
      } /* for(i=0;i<epoch_length;++i) */
```

```
                            -55-
        /* for(epoch=0;TRUE;++epoch) */ terminate:
        printf("\n");
5       printf("anneal_vector_from_temp: TERMINATING\n");
        printf("anneal_vector_from_temperature: temperature=%lf\n",temp);
        printf("anneal_vector_from_temperature: accept_rate=%lf\n",
              ((double)accept_count)/(double)since_checkpoint_count);
        printf("anneal_vector_from_temperature: average sdev=%lf\n",
10            sdev_sum/(double)since_checkpoint_count);
        printf("anneal_vector_from_temperature: objective=%lf\n",
              best_checkpoint_objective);

if(accum_objective < best_checkpoint_objective)
15      {
          wn_copy_vect(solution_vect,vect,len);
          (*pcheckpoint)(solution_vect);
          best_checkpoint_objective = accum_objective;
        }
20
        fflush(stdout);

force_optimize_stop_flag = FALSE;
        wn_gpfree();
25    } if 0
      void test_anneal()
30    {
        extern double wn_normal_distribution();
        int i,accept_count;
        double x,xnew,sdev,objective,objectivenew,temperature,prob_acceptance,
              total_movement,movement;
35
        accept_count = 0;
        total_movement = 0.0;
        temperature = 1.0;
        sdev = 1.75;
40      x = 0.0;
        objective = x*x;

for(i=0;i<100000;++i)
        {
45        movement = sdev*wn_normal_distribution();
          xnew = x+movement;
          objectivenew = xnew*xnew;
          if(objectivenew <= objective)
          {
```

I claim:

1. A method of creating a three dimensional halftone dither matrix, said matrix being divided into a predetermined number of levels with each level comprising a two dimensional matrix of activation indicators having positional values including x and y positional components, said method being performed using a computer and comprising the steps of:

(a) creating a series of three dimensional curves, from a two dimensional array of dither values, said two dimensional array being of the same dimensions as said two dimensional matrix and comprising level value entries, each of said level value entries having a corresponding three dimensional curve, said three dimensional curve starting at a starting level corresponding to said dither matrix value and at a position corresponding to the x and y positional components of said level value entry, said three dimensional curve terminating on the highest level of said three dimensional halftone dither matrix and taking one x and y positional value on each level between said starting level and said highest level, (b) forming an objective function having at least two components, a first component being a measure of the evenness of the distribution of the positional values of said curves for a particular level, and the second component being a measure of the deviation of said curve from a straight vertical line, (c) optimising said objective function so that the positional values at any of said levels of said series of curves have a high degree of evenness of distribution and said curves have a low degree of deviation from a straight vertical line, and (d) forming said three dimensional halftone dither matrix wherein said activation indicators are active in positions corresponding to the paths of each of said curves.

2. A method as claimed in claim 1, wherein said optimising step includes the process of swapping a portion of a first of said curves from a first positional coordinate to a second positional coordinate on the same level, said second positional coordinate not being occupied by another of said curves.

3. A method as claimed in claim 2, wherein said optimising step includes the process of swapping all the portion of said curve between said same level and said highest level from said first positional coordinate to said second positional coordinate.

4. A method as claimed in claim 1, wherein said curves are initially straight lines.

5. A method as claimed in claim 1, wherein said second component is of the form:

$$\sum_{\text{all possible curves}} \left[ \sum_{\substack{\text{all possible pairs of points} \\ (p_1, p_2) \text{ on the curve} \\ \& \ p_1 \neq p_2}} \right] w(l_1 - l_2)[(x_1 - x_2)^2 (y_1 - y_2)^2]$$

where each point of a curve is represented by a three-tuple, having a x value, a y value, and a level value denoted l, and the weighting function $w(l_1-l_2)$ represents a weight applied which is proportional to the distance between the two levels $l_1$ and $l_2$, being the corresponding levels of the points $P_1$ and $P_2$.

6. A method as claimed in claim 1, wherein said first component is of the following form:

$$\sum_{\text{all possible intensities}} \left[ \sum_{\substack{\text{all possible pairs of points } (p1, p2) \\ \text{wiht the same colour at a given intensity} \\ p1 \text{ not equal to } p2}} \right] \left( \frac{1}{\text{dist}(p1, p2)^{\gamma}} \right)$$

where dist(p1,p2) is a distance measure from the point p1 to the point p2 where distance is measured in a modulo or wrap around sense, and γ is a positive number.

7. A method as claimed in claim 1, wherein said second component only measures the deviation of said curve from a straight line over a predetermined length of said curve.

8. A method as claimed in claim 1, wherein said first component is of the form:

$$\left( \sum_{\substack{\text{all possible} \\ \text{intensities}}} \right) W_f(\text{intensity}) \left[ \sum_{\substack{\text{all possible pairs of} \\ \text{points } (p1, p2), \text{ with the} \\ \text{same colour at a given} \\ \text{intensity, } p1 \text{ not equal} \\ \text{to } p2, \text{ dist}(p1, p2) < \\ \text{window\_radius}}} \right] \left( \frac{1}{\text{dist}(p1, p2)} - \frac{1}{\text{window\_radius}} \right)$$

where $w_f$(intensity) is a weighting function which takes values substantially in accordance with the perception of the human eye of the corresponding intensity level, window_radius is a predetermined constant and dist(p1,p2) is a distance measure modulo the size of the dither matrix.

9. A method of halftoning an image comprising an array of pixels with each pixel having an intensity level indication, said method utilising a dither matrix as claimed in claim 1 and comprising the steps of, for each of said pixels: utilising the intensity level indication to determine the level of a two dimensional bit map array within said three dimensional halftone dither matrix and a portion of the address of said pixel within the array of said pixels to determine a positional location within said two dimensional bit map array, so as to derive a marking output value for each of said pixels.

10. A method as claimed in claim 9 wherein said marking value is one of two values.

11. An apparatus for halftoning an input image comprising:

an inputting device for inputting pixel data values including intensity level and address data, a table look up device, connected to said inputting device, and containing a series of two-dimensional arrays of dither values comprising level value entries, each of said level value entries having a corresponding three-dimensional curve starting at a starting level corresponding to a three-dimensional halftone dither matrix value and at a position corresponding to x and y positional components of said level value entry, said three-dimensional curve terminating on a highest level of said three-dimensional halftone dither matrix and taking one x and y positional value on each level between said starting level and said highest level wherein said level value entries have been optimised so that said level value entries of said curves have a high degree of evenness of distribution and said curves have a low degree of deviation from a straight vertical line, said intensity level data being used to select one of said series of two-dimensional arrays and address data being used to address a data value within said selected two-dimensional array, and a marking device, connected to said look-up device, for making an output image when said data value exceeds a predetermined threshold.

\* \* \* \* \*

UNITED STATES PATENT AND TRADEMARK OFFICE
CERTIFICATE OF CORRECTION

PATENT NO. : 5,706,105

DATED : January 6, 1998

INVENTOR(S) : WILLIAM CLARK NAYLOR, JR.   Page 1 of 4

It is certified that error appears in the above-identified patent and that said Letters Patent is hereby corrected as shown below:

COLUMN 1

Line 12, "on it being" should read --only being able--.

COLUMN 2

Line 4, "spread," should read --spread--;
Line 26, "said" should read --the--;
Line 43, "said" should read --the--;
Line 56, "making" should read --marking--; and
Line 59, "embodiment" should read --embodiments--.

COLUMN 3

Line 46, "FIG. 1," should read --FIG. 1.--.

COLUMN 4

Line 3, "(eg." should read --(e.g.--;
Line 26, "a" should read --as a--; and
Line 54, "storm" should read --stored--.

COLUMN 5

Line 65, "intensities;" should read --intensities.--.

UNITED STATES PATENT AND TRADEMARK OFFICE
CERTIFICATE OF CORRECTION

PATENT NO. : 5,706,105

DATED : January 6, 1998

INVENTOR(S) : WILLIAM CLARK NAYLOR, JR.

It is certified that error appears in the above-identified patent and that said Letters Patent is hereby corrected as shown below:

COLUMN 7

Line 27, "above mentioned" should read
--above-mentioned--; and

Line 53, "(ie." should read --(i.e.--.

COLUMN 9

Line 40, " $\frac{|Dc - Dp|}{dist\ (pc,p)}$ "

should read -- $\frac{|Dc - Dp|}{dist\ (pc,p)}$ (EQ 20)--; and

Line 59, "required:" should read --required.--.

UNITED STATES PATENT AND TRADEMARK OFFICE
CERTIFICATE OF CORRECTION

PATENT NO. : 5,706,105

DATED : January 6, 1998

INVENTOR(S) : WILLIAM CLARK NAYLOR, JR.          Page 3 of 4

It is certified that error appears in the above-identified patent and that said Letters Patent is hereby corrected as shown below:

<u>COLUMN 91</u>

After the existing column, insert the following:

```
--                              -56-
      ++accept_count;
      total_movement += movement*movement;
      x = xnew;
      objective = objectivenew;
 5  }
    else
    {
      prob_acceptance = exp(-(objectivenew-objective)/temperature);

10    if(wn_true_with_probability(prob_acceptance))
      {
        ++accept_count;
        total_movement += movement*movement;
        x = xnew;
15      objective = objectivenew;
      }
     }
    }

20  printf("accept_count=%d total_movement=%lf\n",accept_count,total_movement);
    }
    #endif 25                  (END OF APPENDIX 3)   --.
```

UNITED STATES PATENT AND TRADEMARK OFFICE
CERTIFICATE OF CORRECTION

PATENT NO. : 5,706,105

DATED : January 6, 1998

INVENTOR(S) : WILLIAM CLARK NAYLOR, JR.

It is certified that error appears in the above-identified patent and that said Letters Patent is hereby corrected as shown below:

COLUMN 94

Line 13, "$P_1$" should read --$p_1$--;
    Line 14, "$P_2$" should read --$p_2$--; and
    Line 59, "claim 9" should read --claim 9,--.

Signed and Sealed this

Twentieth Day of October, 1998

Attest:

BRUCE LEHMAN

Attesting Officer

Commissioner of Patents and Trademarks